United States Patent
Davis et al.

(10) Patent No.: US 7,263,253 B2
(45) Date of Patent: Aug. 28, 2007

(54) OPTIMIZED RECONFIGURABLE OPTICAL ADD-DROP MULTIPLEXER ARCHITECTURE WITH MEMS-BASED ATTENUATION OR POWER MANAGEMENT

(75) Inventors: Joseph E. Davis, Morgan Hill, CA (US); Mark H. Garrett, Morgan Hill, CA (US); Brian Tremaine, San Jose, CA (US); Michael Darling, San Jose, CA (US)

(73) Assignee: Capella Photonics, Inc., San Jose, CA (US)

( * ) Notice: Subject to any disclaimer, the term of this patent is extended or adjusted under 35 U.S.C. 154(b) by 55 days.

(21) Appl. No.: 11/103,839

(22) Filed: Apr. 11, 2005

(65) Prior Publication Data

US 2006/0228072 A1 Oct. 12, 2006

(51) Int. Cl.
G02B 6/26 (2006.01)
(52) U.S. Cl. .......................................... 385/18; 385/140
(58) Field of Classification Search ...................... None
See application file for complete search history.

(56) References Cited

U.S. PATENT DOCUMENTS

| | | | |
|---|---|---|---|
| 5,745,271 A | 4/1998 | Ford et al. | |
| 5,960,133 A | 9/1999 | Tomlinson | |
| 6,204,946 B1 | 3/2001 | Aksyuk et al. | |
| 6,307,657 B1 | 10/2001 | Ford | |
| 6,327,398 B1 | 12/2001 | Solgaard et al. | |
| 6,539,142 B2* | 3/2003 | Lemoff et al. | 385/18 |
| 6,549,699 B2 | 4/2003 | Belser et al. | |
| 6,580,846 B1* | 6/2003 | Burroughs et al. | 385/16 |
| 6,625,346 B2 | 9/2003 | Wilde | |
| 6,634,810 B1 | 10/2003 | Ford et al. | |
| 6,647,172 B2 | 11/2003 | Giles et al. | |
| 6,657,770 B2 | 12/2003 | Marom et al. | |
| 6,661,945 B2 | 12/2003 | Tedesco et al. | |
| 6,661,948 B2 | 12/2003 | Wilde | |
| 6,687,431 B2 | 2/2004 | Chen et al. | |
| 6,704,476 B2 | 3/2004 | Ford et al. | |
| 6,753,960 B1* | 6/2004 | Polynkin et al. | 356/330 |
| 6,757,458 B2 | 6/2004 | Neilson et al. | |
| 6,760,511 B2* | 7/2004 | Garrett et al. | 385/24 |
| 6,795,182 B2* | 9/2004 | Rakuljic et al. | 356/328 |
| 6,845,195 B2 | 1/2005 | Tedesco | |
| 6,968,098 B2* | 11/2005 | Barrett | 385/15 |
| 2002/0071627 A1* | 6/2002 | Smith et al. | 385/15 |
| 2004/0013348 A1* | 1/2004 | Dickson | 385/18 |
| 2004/0033010 A1* | 2/2004 | McGuire | 385/16 |

* cited by examiner

*Primary Examiner*—Rodney Bovernick
*Assistant Examiner*—Mike Stahl
(74) *Attorney, Agent, or Firm*—Barry N. Young

(57) ABSTRACT

A wavelength selective switch architecture for ROADMs for switching the spectral channels of a multi-channel, multi-wavelength optical signal between input and output ports employs a biaxial MEMS port mirror array for optimal coupling efficiency and ITU grid alignment, an anamorphic beam expander for expanding input optical signals to create an elongated beam profile, a diffraction grating for spatially separating the spectral channels, an anamorphic focusing lens system, an array of biaxial elongated channel MEMS micromirrors, a built-in Optical Channel Monitor, and an electronic feedback control system. The bi-axial channel micromirrors are rotatable about one axis to switch spectral channels between ports, and are rotatable about an orthogonal axis to vary the coupling of the spectral channel to an output port and control attenuation of the spectral signal for complete blocking or for a predetermined power level. The architecture affords hitless switching, near notchless operation, ITU channel alignment, high passband, stability over a broad temperature range, and minimum insertion loss through the optimal optical coupling efficiency enabled by the feedback control system.

39 Claims, 8 Drawing Sheets

OPTIMIZED RECONFIGURABLE OPTICAL ADD-DROP MULTIPLEXER ARCHITECTURE WITH MEMS-BASED ATTENUATION OR POWER MANAGEMENT

BACKGROUND

This application relates generally to optical communications systems and methods for wavelength division multiplexed (WDM) optical networks, and more particularly to wavelength selective switch systems and methods having optimized optical performance for switching and managing the power of individual spectral channels of a multi-channel optical signal.

Multi-channel optical signals of the type to which the invention pertains comprise a plurality of spectral channels, each having a distinct center wavelength and an associated bandwidth. The center wavelengths of adjacent channels are spaced at a predetermined wavelength or frequency interval, and the plurality of spectral channels may be wavelength division multiplexed to form a composite multi-channel signal of the optical network. Each spectral channel is capable of carrying separate and independent information. At various locations, or nodes, in the optical network, one or more spectral channels may be dropped from or added to the composite multi-channel optical signal, as by using, for example, a reconfigurable optical add-drop multiplexer (ROADM). Reconfigurable optical add-drop multiplexer architectures are disclosed in commonly assigned U.S. Pat. Nos. 6,549,699, 6,625,346, 6,661,948, 6,687,431, and 6,760,511, the disclosures of which are incorporated by reference herein.

All optical switching nodes may comprise one or more wavelength selective switches (WSS) configured as ADD and/or DROP modules. The referenced patents disclose wavelength selective switch apparatus and methods comprising an array of fiber coupled collimators that serve as input and output ports for optical signals, a wavelength-separator such as a diffraction grating, a beam-focuser, and an array of channel micromirrors, one micromirror for each spectral channel. In operation, a composite multi-wavelength optical signal (also referred to herein as a "multi-channel optical signal") from an input port is supplied to the wavelength separator. The wavelength separator spatially separates or demultiplexes the free-space multi-wavelength optical signal into an angular spectrum of constituent spectral channels, and the beam-focuser focuses the spectral channels onto corresponding ones of the channel micromirrors. The channel micromirrors are positioned such that each channel micromirror receives an assigned one of the separated spectral channel beams. The micromirrors are individually controllable and continuously pivotal (or rotatable) so as to reflect the spectral channel beams into selected output ports. This enables each channel micromirror to direct its corresponding spectral channel into any possible output ports and thereby switch the spectral channel to any desired output port. Each output port may receive none, one, or more than one of the reflected and so directed spectral channels. Spectral channels may be selectively dropped from a multi-channel signal by switching the channels to different output ports, and new input channels may be selectively added or combined with the original channels to form different multi-wavelength composite signals.

Several types of free-space beam separators are commercially available including but not limited to; reflection gratings such as high spatial frequency gratings holographically formed, low spatial frequency gratings such as an Echelle grating, which is a ruled grating, and transmission gratings which can be holographically formed in various polymers. Diffraction gratings used for wavelength selective separation WSS devices may also be polarization sensitive, having higher diffraction efficiency for one polarization state. Accordingly, to maintain an acceptable system insertion loss and polarization dependent loss, it may be necessary to employ a polarization diversity strategy where the polarization state of an input beam is decomposed into its orthogonal components, and the lower efficiency polarization component is rotated into the most efficient polarization state for diffraction. This requires that the two beam components be managed throughout the optics of the system, which increases the form factor of the device.

In wavelength selective switch architectures of the type to which the invention pertains, it is desirable to optimize the optical and mechanical characteristics of the system while providing a small form factor. Typically, in known apparatus and methods, although the input beam to the wavelength separator may be collimated and circular in cross-section, some wavelengths of the diffracted beam may be elliptical in cross-section and expanded due to anamorphic expansion of the beam caused by the diffraction grating. With other wavelengths, there may be no expansion, and with still others there could be compression, depending on the type of grating utilized and incident and diffracted angles. Also, the beam size at a channel micromirror is determined by the relationship between the input beam size, the anamorphic expansion or compression of the beam, and the focal length of the focusing optics. Therefore, in some wavelength switches that lack control of the beam size before diffraction and incident to the focusing optics, the spot size on a channel micromirror may not be readily controllable. This makes it necessary to size the micromirror sufficiently to accommodate possible variations in the input beam conditions and the viable focal length of the focusing optics. For instance, simply accepting the anamorphic beam expansion created by a grating may be insufficient to minimize the spot size on the channel micromirrors to create a high passband. In general, these factors prevent optimization of key optical parameters of the system, such as passband, and key mechanical parameters of the micromirrors, such as resonant frequency, which is inversely proportional to the mass of the mirror, and aerodynamic interaction between micromirrors, which is approximately proportional to their length to the third power. Thus, in some WSS designs known in the art, the input beam is modified by passing it through a prism pair anamorphic beam expander. This preferentially increases the beam expansion in one dimension. However, to substantially reduce the form factor, optical control of the beam sizes throughout propagation is necessary, and a one dimensional anamorphic beam expander is inadequate. Further, it can be advantageous to simultaneously (concomitant with the anamorphic beam expansion and beam size control) relay the angular rotation of a MEMS (micro electro mechanical systems) port mirror, and optically convert this angular rotation into a translation of the channels at the channel mirror to maintain channel frequency alignment as defined by the International Telecommunication Union, (ITU alignment). The aforementioned anamorphic beam expansion from the grating or from a prism pair alone does not accomplish this.

It is also desirable, for a number of reasons, to be able to monitor and control the power in individual spectral channels of the multi-wavelength optical signal. This includes the ability to completely block the power contained in a particular spectral channel. One reason for blocking the power in a channel is to afford "hitless" switching to minimize undesired crosstalk during the repositioning of an input spectral channel beam from one output port to a different desired output port. During repositioning, the channel micromirror scans the input spectral channel beam across (i.e., "hits") intermediate ports, which couples unwanted light into the intermediate ports, and causes crosstalk. Thus, it is desirable either to completely block or to substantially attenuate the power in the beam during scanning so that unwanted light coupling is avoided. Another use of monitoring and controlling the optical power of a channel is to afford attenuation of that channel to some predetermined level.

The above-mentioned U.S. patents disclose one approach to power management and hitless switching that employs a spatial light modulator, such as a liquid crystal pixel array, to attenuate or completely block the power contained in the spectral channels. Each pixel in the liquid crystal array is associated with one of the spectral channels, and a separate focal plane is created at the location of the liquid crystal array such that a spectral spot corresponding to each channel is located on its associated pixel. Since the voltage applied to the pixel controls the light transmissivity of a pixel, the pixel can be made less transmissive or opaque to the transmission of light by applying an appropriate voltage, thereby attenuating or completely blocking the power in the spectral channel passing through that pixel. However, this approach has the disadvantage of requiring additional components, including a relay lens system to create a focal plane at the liquid crystal array, the liquid crystal array itself, and electronics to control the liquid crystal array. In addition to the added costs for such additional components, more physical space is needed to accommodate these components, which increases the overall size and complexity of the system.

U.S. Pat. No. 6,549,699 discloses another approach to power management of spectral channels in which the rotation of a channel micromirror about its switching axis (the axis parallel to the array of channel micromirrors) is controlled to vary the spatial location of the reflected spectral channel beam relative to its intended output port. Since the amount of power in a spectral channel that is coupled to an output port is a function of the coupling efficiency, a desired power level can be obtained by pivoting the channel micromirror a predetermined angle to decouple the optical beam relative to the output port to attenuate it by an amount corresponding to the desired output power level.

A disadvantage of this latter approach is that decoupling the spectral channel beam spatially repositions the beam along the switching axis. Depending upon the physical spacing of adjacent output ports, a portion of the beam may be cross-coupled into an adjacent output port, causing detrimental cross-talk between the ports. Increasing the physical spacing of the ports to decrease the cross-coupling undesirably increases the physical size of the device. Furthermore, as will be described in detail later, using this approach it is difficult to accurately control the power output levels of spectral channels due to the sensitivity of the coupling to rotation of the channel mirror about the switching axis.

It is desirable to have the following functions integrated into one wavelength selective switch system including: demultiplexing, multiplexing, fully flexible wavelength switching, non-blocking hitless switching, dynamic channel equalization to an arbitrary profile, variable optical attenuation, channel power monitoring, wavelength blocker, and wavelength connectivity confirmation. In addition, it is desirable for the architecture to achieve accurate attenuation of spectral channels, that the system be capable of operation as either an ADD or DROP module, and have a small form factor and low cost. Finally, all these functions should exist in a system with low polarization dependent loss, low insertion loss, and high optical passband while simultaneously maintaining accurate ITU channel alignment. While each of the aforementioned patents and embodiments known in the art addresses some of the integrated functionality desired in a wavelength selective switch, they fail to achieve a satisfactory level of integration of the desired functionality, performance, or accuracy of control. Therefore, it is desirable to provide compact, more flexible and more cost-effective architectures for achieving the multi-functionality of a wavelength selective switch, which includes achieving the aforementioned properties and functionality. It is to these ends that the present invention is directed.

SUMMARY OF THE INVENTION

The invention provides new and improved methods and apparatus for wavelength switching of spectral channels of a multi-port, multi-wavelength optical signal that optimize optical and mechanical characteristics, while managing the power or attenuation levels of individual spectral channels of a multi-wavelength optical signal that solve the foregoing problems and disadvantages of known methods and apparatus and afford other significant advantages and benefits.

These advantages and benefits include: accurate and stable alignment of the ITU channels, high optical passband, optimum coupling of spectral channels to ports, optimum mechanical characteristics and form factor, and accurate and stable control of power or attenuation levels under a broad range of environmental conditions. The invention enables accurate control of the attenuation and power levels of individual channels in a multi-port, multi-channel optical system that affords hitless switching of channels and near "notchless" operation whereby the power levels within the passband of spectral channels can be made approximately the same as the power levels outside the passband between adjacent channels (between the two adjacent mirrors). This enables the transmission of arbitrary optical wavelengths (that need not be confined to any particular ITU grid) regardless of wavelength or spacing between wavelengths so long as the wavelengths are between the upper and lower limits of the wavelength band of interest.

As used in this specification, the term "power" or "power level" refers to the optical power relative to a reference power level, and the term "attenuation" refers to a reduction in power relative to the reference level. The reference power level may be, for instance, the maximum (unattenuated) power level at either an input or an output (of a channel, for example), or an absolute power level such as 0 dBm.

In one aspect, the invention provides apparatus for switching spectral channels of multi-channel (multi-spectral) optical signals between a plurality of input and output ports provided by fiber coupled collimators. An anamorphic system converts a multi-channel optical signal from an input port into a beam that has a predetermined beam profile. The beam is separated spatially into constituent spectral channel beams that are focused onto an array of biaxial channel micromirrors with each channel beam having an elongated beam profile. Each micromirror of the array of bi-axial channel micromirrors receives a constituent spectral channel beam and has a shape compatible with the elongated beam profile. The channel micromirrors are rotatable about a switching axis to switch a spectral channel to a selected output port, and are rotatable about an orthogonal attenuation axis to control the power level at such output port.

More particularly, the optical passband is approximately given by the spot size convolved with the mirror size. Thus, the smaller the spot size and the larger the mirror size the greater the passband. In the optical switching apparatus of the invention, optical signals from an input port are anamorphically expanded, spatially separated by the grating, and focused (by the focusing optics) as elongated spots aligned and centered on corresponding channel micromirrors that have a rectangular shape and size and a narrow gap between mirrors to optimize passband. The anamorphic optics optimally enlarges the input beam size to the focusing optics along the grating dispersion direction to provide a small spot size at a channel micromirror, thus additionally optimizing the optical passband.

In other more particular aspects, the channel micromirrors are rotatable about the attenuation axis to steer the output beams off the fiber coupled collimator array. This permits wavelength blocking. In addition, by rotating the biaxial channel mirror about each axis in the proper sequence, the system can achieve hitless reconfiguration.

Additionally, the invention facilitates maintaining channel alignment of multi-wavelength signals and controlling the beam size and location on the micromirrors. This permits channel micromirror size to be optimized to minimize aerodynamic cross-talk, to control (by design) the mirror resonant frequency, and minimize the required voltage for switching.

In another aspect, the invention provides a method of optimizing passband in optical switching apparatus in which optical signals from an input port are anamorphically expanded and converted to a beam having a predetermined profile. The beam is spatially separated into constituent spectral channel beams that are focused as elongated spots aligned and centered on corresponding channel micromirrors that have a compatible elongated shape and size as the channel beams.

In still another aspect, the invention affords a method of aligning the spectral channels on the channel micromirrors of a wavelength switch in which the constituent spectral channels of an input multi-channel optical signal (with which a reference optical signal has been combined) are focused as elongated spots onto channel micromirrors at a location determined by the angle of rotation of a port mirror. The angular position of the port mirror is controlled by the position of the reference beam on a detector to align adjacent separated spectral channels on adjacent channel micromirrors at predetermined locations.

Other more specific aspects of the invention will be set out in the description and claims that follow.

DESCRIPTION OF PREFERRED EMBODIMENTS

Figure 1:
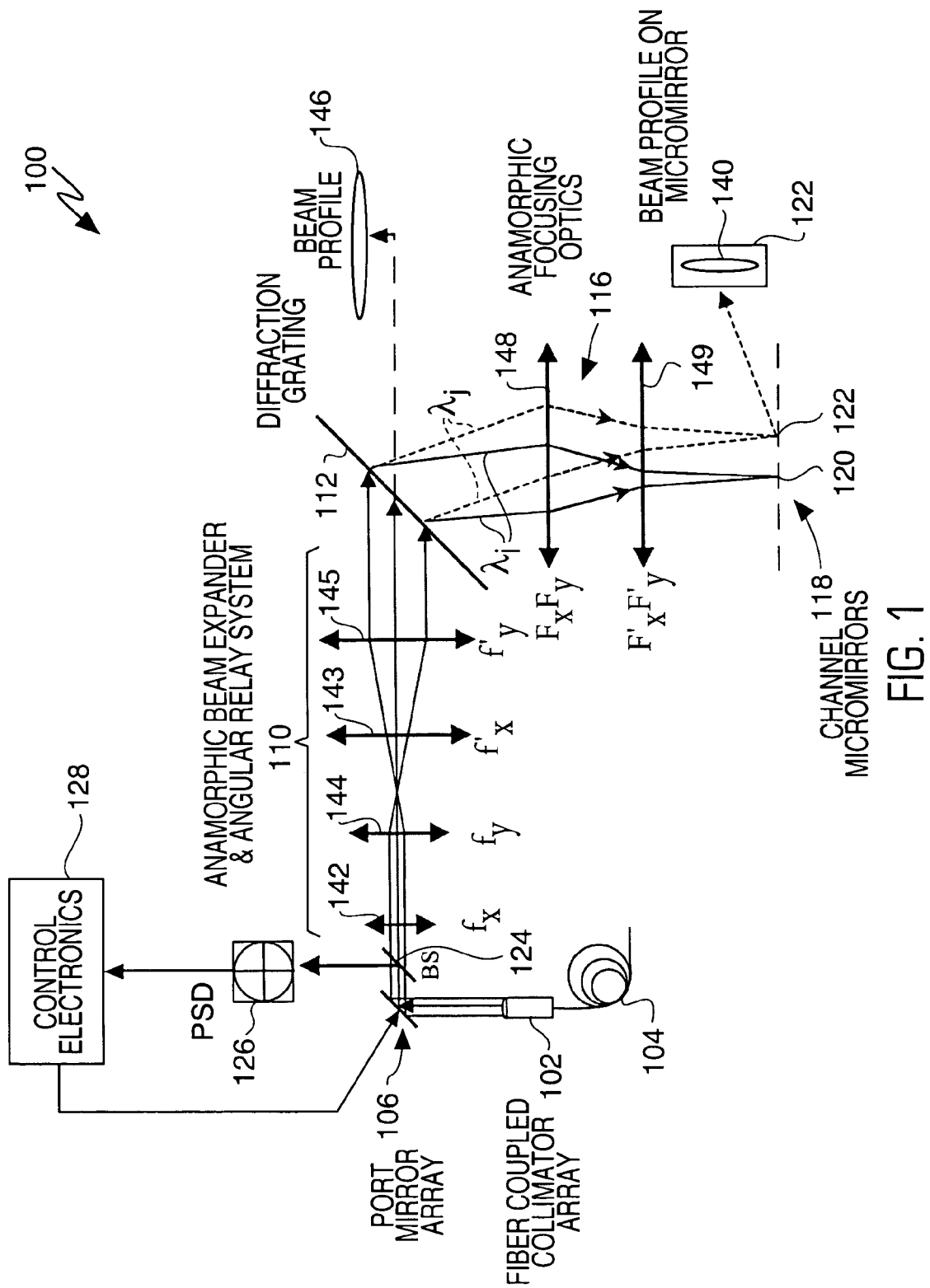
FIG. 1 is a diagrammatic view illustrating the architecture of a wavelength selective switch (WSS) in accordance with the invention, which may be employed in an ADD or DROP module of a ROADM.

This invention is particularly applicable to wavelength selective switches (WSS) as used, for example, in reconfigurable optical add-drop multiplexers (ROADMs) permitting dynamic network reconfiguration and enabling management of the power or attenuation of individual spectral channels of a multi-wavelength (multi-channel) optical signal, such that signals can be readily added to or dropped from the network. It will become apparent, however, that this is illustrative of only one utility of the invention FIG. 1 is a diagrammatic view that illustrates the architecture of a portion of a wavelength selective switch 100 in accordance with the invention. One or more wavelength selective switches having an architecture as shown in the figure and configured as ADD or DROP modules, may be combined in a ROADM at a node of a wavelength division multiplexed (WDM) optical network, for example. As shown, WSS 100 may comprise a fiber collimator array 102 which provides a plurality of input and output ports for optical signals that are input to and output from the WSS by a plurality of optical fibers 104. Fiber collimator array 102 may comprise a plurality of individual fiber coupled collimators, one connected to each optical fiber as shown as will be described in more detail, for example, in connection with FIGS. 6-8. WSS 100 may further comprise a port mirror array 106 comprising an array of port mirrors, (as shown, for example, in FIGS. 7-8) such as bi-axial MEMS micromirrors, an optical beam expander and relay system 110, a wavelength separator 112 which is preferably a diffraction grating, beam focusing optics 116 and an array of channel micromirrors 118, optically arranged as illustrated in FIG. 1.

A composite multi-wavelength optical signal comprising a plurality of spectral channels may be supplied to an input port of the fiber collimator array 102 and reflected and aligned by a corresponding port mirror of the port mirror array 106 through the beam expander and relay system 110 onto the diffraction grating 112. For reasons to be explained, in accordance with the invention, the beam expander and relay system 110 is an anamorphic system, e.g., lenses, that provides different magnifications along orthogonal axes. The diffraction grating angularly separates the constituent spectral channels of the multi-wavelength optical signal to provide an array of spatially separated spectral channels. The focusing optics 116, which is preferably a telecentric and also an anamorphic system, focuses the individual spectral channels into spectral spots having a predetermined profile onto corresponding ones of the channel micromirrors of array 118. Two such channels having center wavelengths $\lambda_i$ and $\lambda_j$ are shown in the figure being focused onto corresponding channel micromirrors 120 and 122, respectively. The channel micromirrors are arranged spatially in the array in accordance with the spatial separation of the spectral channels of the composite multi-wavelength optical signal induced by the diffraction grating and the focusing optics such that each channel micromirror receives one of the spectral channels. Spectral channels are reflected from the micromirrors back through the optical system to the fiber collimator array. The channel micromirrors are individually controllable, as will be described, such that upon reflection a-spectral channel may be directed, i.e., switched, into a desired output port of the fiber collimator array with a desired coupling efficiency or attenuation.

Each output port may receive and output any number of the reflected spectral channels. Accordingly, spectral channels may be selectively dropped from the composite multi-channel signal by switching the channels to one or more "drop" output ports, and the multi-channel signal containing the remaining channels may be output from a "pass-through" port. Moreover, new input channels may be selectively added or combined at an output port with a subset of the original spectral channels to form a different multi-channel composite signal. Both WSS DROP modules that drop channels from and WSS ADD modules that insert or add channels to the multi-channel optical signal may employ a similar architecture to that shown in FIG. 1, as will be described.

Generally, there may be a separate channel micromirror in array 118 for each spectral channel. A typical multi-channel WDM optical signal may have 45 or 96 spectral channels, for example. Accordingly, array 118 of FIG. 1 may comprise 45 or 96 channel micromirrors. The channel micromirrors preferably comprise silicon micromachined mirrors (MEMS mirrors), and each micromirror is preferably a biaxial device, which is capable of independent continuous rotational movement about two orthogonal axes. As will be explained in more detail shortly, this enables a channel micromirror to be pivoted about a first axis to reflect a corresponding spectral channel to a selected output port, and pivoted about the orthogonal axis to control the amount of power coupled to that output port.

The WSS of FIG. 1 may further comprise a beam splitter 124 disposed in the optical path between the port mirror array and the anamorphic beam expander and relay system 110, a position sensitive detector (PSD) 126 that receives a light beam reflected from the beam splitter, and associated control electronics 128 responsive to signals from the PSD for controlling the mirrors of the port mirror array 106. As will be described in more detail, this arrangement enables alignment of the beams from the port mirrors onto the center of the channel micromirrors, which contributes to optimizing the passband and maintaining ITU grid alignment.

Figure 2:
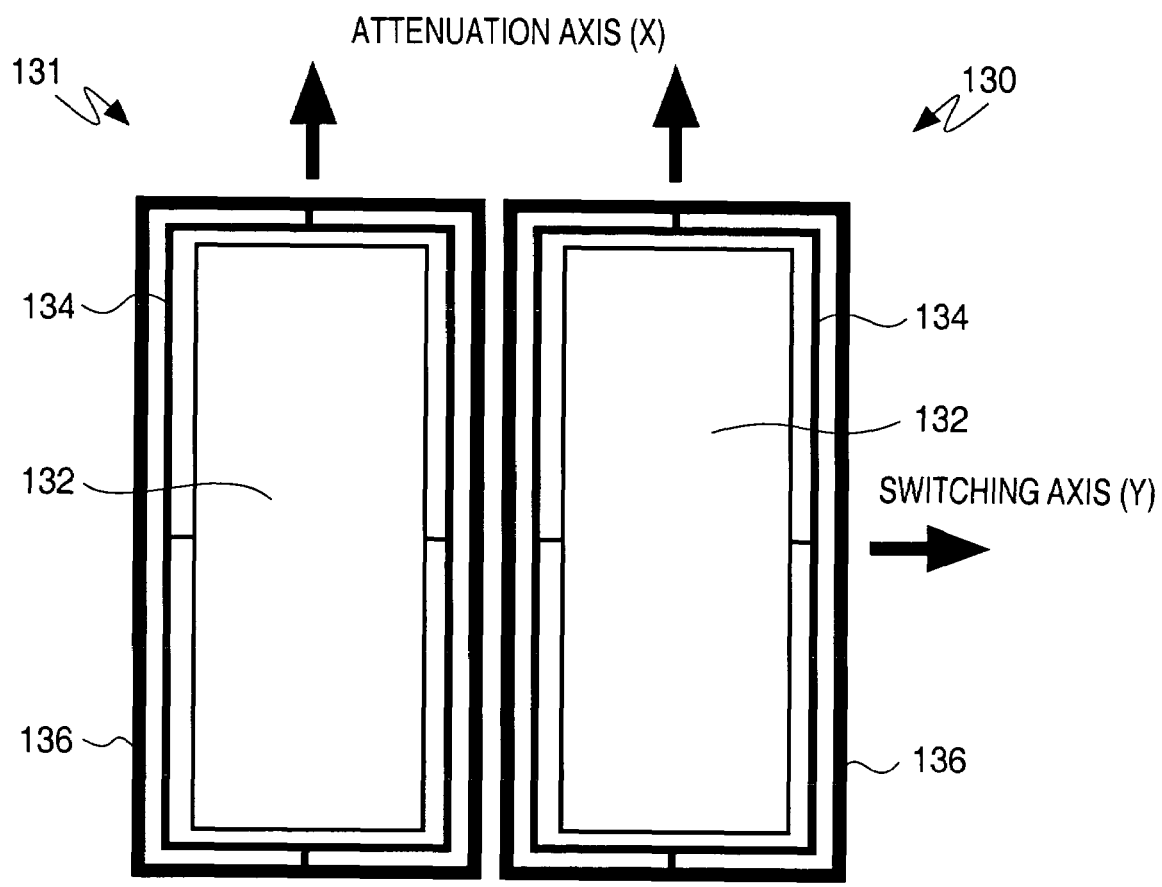
FIG. 2 illustrates a pair of adjacent biaxial channel micromirrors of a micromirror array that may be employed in the wavelength selective switch of FIG. 1.

FIG. 2 illustrates a preferred construction of a biaxial channel micromirror in accordance with the invention. The figure shows only a pair of adjacent biaxial MEMS channel micromirrors 130, 131 of the plurality of micromirrors of array 118. As suggested by the figure, the remaining micromirrors of the array extend horizontally (in the figure) along the switching axis Y with the same lateral spacing between micromirrors. All micromirrors of the array may have the same construction. Each channel micromirror may compromise an assembly of a planar reflective surface 132 pivotally supported on an inner gimbaled frame 134 for rotation about a horizontal (in FIG. 2) "switching" axis Y. Gimbaled frame 134 may be pivotally supported on an outer frame 136 for rotation about an orthogonal "attenuation" axis X. The pivoting movement of the reflective mirror surface 132 about the orthogonal axes may be continuously variable and actuated electrostatically by applying voltages to opposing pairs of control electrodes (not shown) in a well known manner.

As shown in FIG. 2, the reflective mirror surface 132 of the channel micromirrors may have an elongated, preferably rectangular, shape and be oriented with their narrow dimension, e.g., width, along the horizontal switching axis Y, and with their long dimension, e.g., length, along the vertical attenuation axis X. There are a number of reasons for this particular micromirror profile and orientation relative to the orthogonal axes. This design affords optimum mechanical performance by affording micromirrors of low mass, high resonant frequency, and low aerodynamic interaction, and optimizes optical performance such as high passband, and affords accurate control of attenuation, as will be explained. Moreover, as indicated below, this elongated rectangular micromirror profile is compatible with the elongated preferably elliptical beam profile of the spectral channel focused onto the micromirror by the focusing optics 116 (FIG. 1).

Referring back to FIG. 1, the switching axis Y of the channel micromirrors of array 118 is parallel to the plane of FIG. 1, while the attenuation axis X extends into the plane of the figure. This is also indicated schematically in FIG. 1 by the illustration of the micromirror 122 and the beam profile 140 of its corresponding channel beam. As previously described, it is desirable that the profile of the spectral channel beams being focused onto the micromirrors also be elongated and oriented to conform generally to the shape and size of the micromirror. Preferably, the channel beams have a generally elliptical shape, as shown. Moreover, it is desirable to control the spot size and location of a channel beam focused upon a corresponding micromirror relative to the micromirror size to minimize unwanted power loss and to maximize the passband. Generally, the larger the size of the input beam 146 to the focusing optics along the grating dispersion direction, the smaller the spot size at the channel micromirror, which optimizes the optical passband.

The collimated input beam from the fiber collimator array 102 generally has a circular cross-section. Accordingly, to provide a controlled beam shape and size on the micromirror, the beam expander and relay system 110 is made anamorphic, i.e., providing different magnifications in the X and Y directions. As indicated in FIG. 1, the anamorphic beam expander and relay system 110 may comprise a series of lenses 142-145, including lenses 142 and 143 having focal lengths $f_x$ and $f'_x$ and lenses 144 and 145 having focal lengths $f_y$ and $f'_y$. The lenses may be bi-conical, cylindrical or toroidal lenses, or other elements that afford a system having anamorphic characteristics. As shown in FIG. 1, the anamorphic beam expander and relay system may provide a beam profile 146 at the diffraction grating 112 that is elongated or generally elliptical in shape. In a preferred embodiment of the invention diffraction grating 112 is preferably a transmission grating selected to have high diffraction efficiency and low polarization dependent loss with little or no anamorphic beam expansion. Accordingly, the anamorphic beam expander and relay system 110 may substantially control the beam profile 146.

From the diffraction grating, beams corresponding to the separated individual spectral channels are focused on to channel micromirrors by the telecentric focusing optics 116, which also is preferably anamorphic, as noted above. As shown, the focusing optics may comprise lens systems 148 and 149 having focal lengths $F_x$ $F_y$ and $F'_x$ $F'y$, respectively.

The anamorphic beam focusing optics changes the beam profile 146 spot size and orientation from the diffraction grating to the optimum size and appropriate orientation to be compatible with the micromirror profile, as indicated by beam profile 140 on the channel micromirror. The channel beams are reflected back through the optical system to the fiber collimator array, and the anamorphic optics determines their characteristics at the output ports. After the channel micromirror design has been determined, the optical characteristics of the anamorphic beam expander and relay system 110 and the anamorphic focusing optics 116 may be selected to provide spectral channel beams having a predetermined compatible size, shape and characteristic at the channel micromirrors as well as at the output ports. As will be described, optimum optical performance is afforded in large part by designing the optical system to optimize the channel beam profiles and their alignment on the micromirrors.

The architecture of the invention also achieves low insertion loss. Where anamorphic beams are utilized, the free space optical wavefront must be managed so as to return to the output optical fiber with minimum wavefront aberration, and in particular with a mode field that matches the fiber input mode field (typically nearly Gaussian). Two beams, each with a different input size or waist to a circularly symmetric optical element will have different minimum waists, locations, divergences, and Rayleigh ranges. If each beam were reflected back from a mirror at the same location to the input fiber source, they would have different and less than optimal coupling efficiencies. This becomes even more evident as the size of one of the beams diminishes relative to the other and to the optical path length of the system. (Eventually, as the form factor of the system diminishes wave optics based designs must be utilized to optimize the performance as compared to ray optics designs.) Therefore, to minimize the insertion loss of a wavelength selective switch in accordance with the invention, the optical design should manage the minimum waist size and location of each orthogonal dimension of the beam with appropriate anamorphic optics such as cylindrical elements, lenses and or mirrors, and toroidal or biconic elements so as to achieve mode matching at the output fiber. This can be accomplished using optical design techniques well known to those skilled in the art, and embodied into the optical design of the invention.

The anamorphic optical system comprising the anamorphic beam expander and relay system 110 and the anamorphic focusing optics 116 are preferably designed to serve several purposes. These include reducing the cross-talk between output ports for beams relayed back through the system from the micromirrors, controlling the beam size on the channel micromirror in the Y direction (along the dispersion direction) to optimize the passband, controlling the beam size on the channel micromirror in the X direction to keep the channel micromirror length small enough to reduce aerodynamic cross-talk, and reducing angular sensitivity of the coupling from the channel micromirror rotation to permit accurate closed loop control of the coupling.

Since a beam diverges as it propagates, especially with small beam sizes, the beam size must be properly propagated throughout the system (via the optical elements) so as to return to the output collimator port with minimum wavefront error and the proper size so that the beam does not insert or couple light into an adjacent port, which produces adjacent port cross-talk. This is especially true for the X dimension of the beam since the ports are aligned adjacent to each other in that direction, and it is desirable to keep the port-to-port spacing at a minimum to minimize the height of the system, i.e., the form factor. The anamorphic beam expander and relay 110 is preferably designed to magnify the beam in the Y dimension so that the spot size can be minimized at the channel micromirror, helping to produce a large passband, and also to magnify slightly the beam in the X dimension so that the beam can be focused to a spot size that reduces the channel micromirror length. Controlling spot size in the X dimension enables controlling the aerodynamic cross-talk, which is proportional to the third power of the length of the micromirror. Also, since the beam is anamorphic at the input to the grating, and it is desirable to put the waist of the beam at the position of the channel micromirror position which facilitates obtaining a desired spot size and achieving the aforementioned properties, the focusing optics 116 are also anamorphic.

The anamorphic beam expander and relay system 110 is also designed to simultaneously relay the angular rotations of a port mirror 106 onto the grating. This changes the angle of incidence of the beam on the grating and the telecentric focusing optics system 116 converts the angular change to a translation of the spectral channel on the channel micromirror array. This affords ITU alignment through a feed forward calibration as will be described.

Figure 3A:
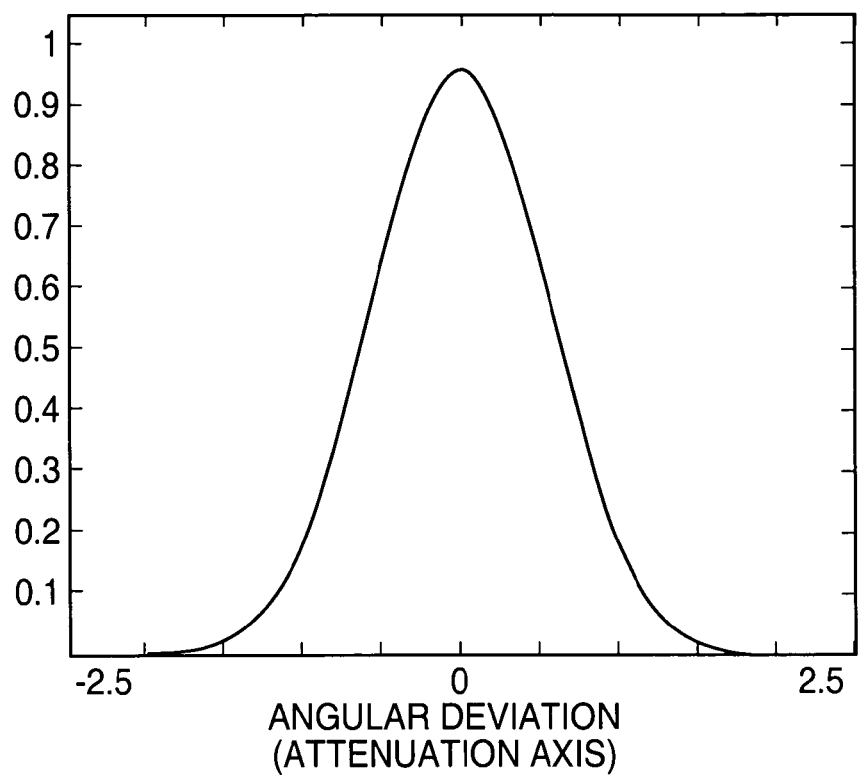
FIGS. 3A-B are representative curves showing differences in coupling efficiency as a function of rotation about orthogonal attenuation and switching axes of the biaxial channel micromirrors of FIG. 2.

The architecture of the invention is significant in affording a simplified and effective approach to managing the power in individual spectral channels that avoids the difficulties and disadvantages associated with previously known approaches to power management, while enabling optical performance to be optimized. In the invention, rotating a channel micromirror about its attenuation axis reduces coupling efficiency for the corresponding spectral channel and causes the amount of light coupled into the output port to be reduced. As the amount of rotation of the channel micromirror about the attenuation axis increases, the coupling continuously decreases until light is no longer coupled to the output port. FIG. 3A is a curve that is representative of the variation in coupling as a function of the angle of rotation of a channel micromirror about its attenuation axis X. As the channel micromirror rotates either positively or negatively from an angle of zero degrees, corresponding to a maximum coupling condition, the coupling rapidly decreases so that at an angle of approximately plus or minus 2.5 degrees, substantially no light is coupled into the output fiber.

Figure 3B:
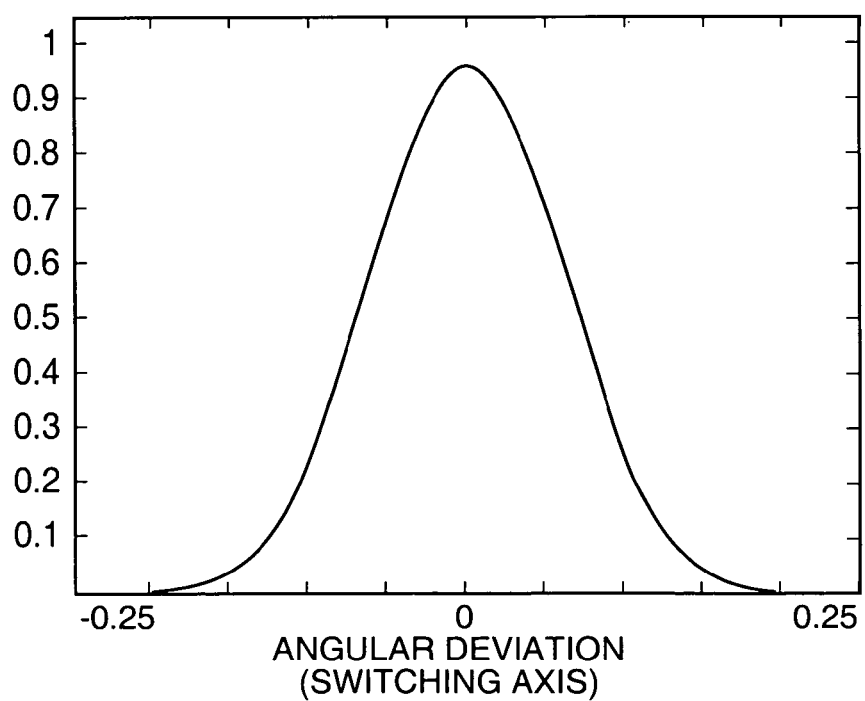

FIG. 3B is a similar representative coupling curve for rotation of the channel micromirror about its switching axis Y. As shown, for the particular micromirror design illustrated in the two curves, the coupling efficiency as a function of angular rotation of the channel micromirror about its switching axis is approximately ten times more sensitive than the coupling efficiency for rotation of the channel mirror about its attenuation axis. For a MEMS channel micromirror having reasonable size and mechanical characteristics and for an optical system designed to afford optimum optical performance in the wavelength range of interest, e.g., 1550 nm, the coupling efficiency for rotation of a channel micromirror about the switching axis Y may be as shown in the curve of FIG. 3B. However, the high sensitivity of coupling efficiency to angular rotation about the switching axis Y for this micromirror, as shown in the curve of FIG. 3B, makes it difficult to accurately and stably control power level using this axis, particularly under adverse environmental conditions such as shock, vibration, temperature variations and aging of components. Rather, desensitizing the coupling efficiency to that shown in FIG. 3A for the attenuation axis X permits more stable and accurate control of power level over the range of normal operating conditions.

For an elongated mirror profile such as shown in FIG. 2, the coupling efficiency of light reflected from the channel micromirrors is determined principally by the anamorphic beam expander and relay system 110 (WSS) of FIG. 1, as will now be explained.

Since the fiber is conjugate to the channel micromirror, rotation of the channel micromirror produces an angular deviation of the beam at the fiber and, accordingly, a coupling change. Thus, the rotation of the channel micromirror produces an angular deviation of the beam at the fiber and, thus, a coupling change. For an anamorphic system, with different focal lengths $f_x$ and $f_y$ along orthogonal X and Y axes, respectively, the angular deviations of the beam at the fiber will, therefore, be different for rotation about the orthogonal axes. Angular rotations $\Delta\theta_x$ and $\Delta\theta_y$ of the channel micromirror create displacements $\Delta x$ and $\Delta y$ of the beam of $\Delta\theta_x f_x = \Delta x$, and $\Delta\theta_y f_y = \Delta y$ at the entrance aperture of the focusing optics. These displacements are relayed onto the output port collimator by the anamorphic beam expander, which, when operating in the reverse direction, causes demagnification of the displacements inversely proportional to magnification factors Mx and My. The output port collimator focuses the light onto the output fiber with the angular deviations $\Delta\theta_{xcoll} = (\Delta x/Mx)/f_{coll}$, and $\Delta\theta_{ycoll} = (\Delta y/My)/f_{coll}$. Typically $f_{x\ and\ fy}$ may differ by 10%, but Mx and My can differ by a factor of 10 or more. Since the displacements are different, the angles of the beam in the orthogonal axis directions onto the output fiber will be different. This produces different angular sensitivities for the orthogonal rotation axis of the channel micromirrors, as shown in FIGS. 3A and 3B. Accordingly, by selecting the magnification factors of the anamorphic optics appropriately, a decrease in angular sensitivity for the attenuation axis relative to the orthogonal switching axis can be obtained that affords accurate control of attenuation and equalization of the power and stable operation.

Figure 4:
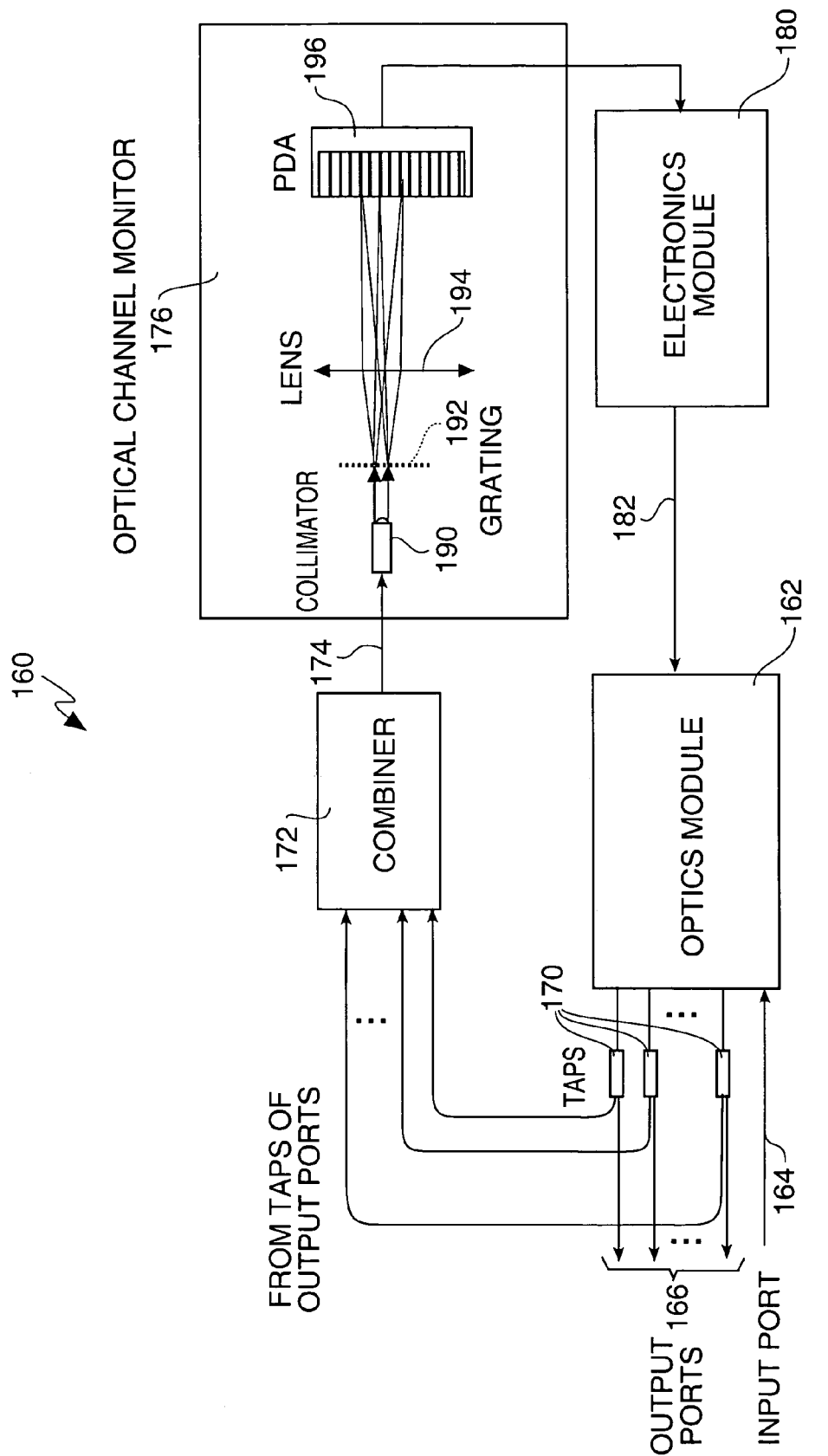
FIG. 4 is a diagrammatic view of a servo control system that may be employed for controlling the rotation of the channel micromirrors about their switching and attenuation axes for managing power level and coupling efficiency of spectral channels of a multi-channel optical signal reflected from the micromirrors.

In order to optimize the coupling of the spectral channels into output ports and to control accurately the power level of each spectral channel, the invention employs a servo-based feedback control system for controlling the rotation about the axes of the channel micromirrors. The same control system preferably may, but need not necessarily, be used to control both orthogonal axes. FIG. 4 illustrates an embodiment of a feedback control system 160 in accordance with the invention that may be used for controlling the rotation about both axes. In the figure, optical module 162 may comprise substantially the optical system of the wavelength selective switch WSS 100 shown in FIG. 1. The optical module may comprise a DROP module having an input port 164 for receiving an input composite multi-channel optical signal, and having a plurality of output pass-through or drop ports 166 for output of either spectral channels or other multi-channel optical signals. Each output port may have a fiber optic coupler (or tap) 170, which samples a portion, e.g., 2%, of the power of the optical signal output on the port. The samples of the optical signals output from the ports may be combined in an optical combiner 172 to form a composite multi-channel signal output onto a fiber 174. The composite multi-channel optical signal may be supplied to an optical channel monitor (OCM) 176, which detects and measures the optical power in each spectral channel and provides this information to an electronics module 180. The electronics module may use the power measurements to generate appropriate electrostatic control signals, which are fed back to the optical module at 182 for controlling the rotation of the channel micromirrors about their attenuation and switching axes.

As shown in FIG. 4, the optical channel monitor may comprise a collimator 190 which receives the composite multi-channel optical signal from the optical combiner, a diffraction grating 192 which spatially separates the multi-channel optical signal into its constituent spectral channels, and a lens system 194 which images the spatially separated spectral channels onto optical sensors, such as a photodiode array (PDA) 196, that detects the optical power levels in each of the spectral components. PDA 196 may comprise, for example, a conventional 1×256 or a 1×512 array of photodiodes spatially arranged such that each of the spectral channels is imaged by the lens system onto a different set of a predetermined number of the photodiodes. The output voltages of the set of photodiodes associated with each spectral channel are supplied to the electronics module 180 and provide a measure of the optical power in that channel. The electronics module may comprise electronic components such as microprocessors, memory and signal processing programs, in firmware, for example, for processing the optical power measurements from the PDA and for generating the appropriate control signals to control the channel micromirrors in optical module 162.

Although the optical channel monitor 176 is shown in FIG. 4 as a separate module, it may be integrated into the optics module 162 for cost and space savings purposes by placing collimator 190 at the collimator array 102 location but at an angle to the other collimators of the array. Due to the conjugate relationship between the fiber and channel micromirrors, an angular rotation of the collimator 190 to the other collimators of collimator array 102 will cause a displacement of the beam from collimator 190 at the channel micromirror array 118. The PDA 196 may be placed at this displaced location thereby integrating the optical channel monitor 176 with the optics module 162.

The feedback control system 160 of FIG. 4 may control the rotation of the channel micromirrors about their attenuation axis and manage the power levels of the optical signals coupled to the output ports. The control system may be used to maintain a preset power level for the optical signal at each output port. The memory in the electronics module may contain tables of stored calibrated values that correspond to different power levels. The voltages output from the PDA 196 of the optical channel monitor 176 to the electronics module 180 representing the power level in each channel may be compared to set points entered into the electronics module corresponding to desired channel power levels. The electronics module may use the power measurements and the set points to generate appropriate electrostatic voltages to the electrodes of the channel micromirrors associated with the attenuation axis of the mirrors. This varies the coupling of a spectral channel signal to its output port and, accordingly, the attenuation applied to the signal to vary the output power at the port. The feedback loop of the control system 160 compares the power measurements from the PDA for the channel with the power level set point, and may control the electrostatic voltages applied to the attenuation electrodes of the associated channel micromirror to drive the micromirror to a coupling that attains the desired power level.

The control system may also continue to monitor the output power level of each channel during operation, and may continuously adjust the voltages applied to the channel micromirror electrodes to maintain a desired attenuation and power level. By using the coupling efficiency curve for the attenuation axis X which is desensitized relative to the switching axis Y, as shown in FIG. 3A, the feedback control system is able to accurately and stably maintain a preset power output level for each channel, even under adverse conditions caused by shock and vibration and variations in temperature. Moreover, as will be described shortly, the control system enables preset power levels to be set and maintained on a channel-by-channel basis over wide ranges.

In addition to controlling the movement of the channel micromirrors about their attenuation axes, the control system 160 of FIG. 4 may also control rotation of the channel micromirrors about their switching axes Y. The electronics module 180 may use the optical power measurements from the optical channel monitor 176 to provide feedback control to the switching axis of channel micromirrors, on an individual basis, to maintain optimal channel coupling.

Preferably, the control system of FIG. 4 employs an alternating or "dither" control signal approach for controlling the rotational position of the channel micromirrors about the switching axis to achieve and maintain optimal coupling from the input to the output. Since there is no interaction between the channel micromirrors, they are independent and may be controlled simultaneously by the processing electronics in the electronics module 180 to optimize the coupling of each. One axis of each channel micromirror may be dithered with a cosine waveform while the orthogonal axis is dithered with a sine waveform of the same dither frequency. The optical channel monitor can detect and measure the dither in a particular wavelength channel and the output power for the channel to determine the micromirror voltages for maximum coupling. These voltages may be saved in the memory, such as flash memory, in the electronics module as open-loop target voltages for each port of the system. When it is desired to switch a spectral channel from one port to another, the voltages stored in the flash memory for the destination port may be used for initially positioning the corresponding spectral channel micromirror at that port. When this open loop switching is complete, the feedback loop may be again enabled and the dither tones used to find the optimal peak coupling of the channel to that port. Achieving optimal coupling is important for minimizing cross-talk between adjacent channels and for enabling the width of the channel micromirrors (the narrow dimension along the switching axis Y) to be minimized to reduce the micromirror size and improve the form factor of the WSS.

The control system of FIG. 4 preferably controls the attenuation and switching axes of the channel micromirrors independently and alternately. After switching a channel from one port to another and optimizing the coupling using the dither tones as just described, the control system may then switch control modes to a straight voltage feedback loop, for example, to control the attenuation axis of the channel micromirror for a desired power level, as described above. The control system preferably does not use a dither approach to control the attenuation axis of the micromirrors because dither amplitude increases as the rotation of the mirror moves away from optimal coupling, which can produce instability.

The dither frequencies are preferably low frequency tones in the range, for example, from about 100 Hz to approximately 250 Hz, and preferably have amplitudes sufficient to produce a small variation in optical power of the order of 0.5% (0.02 dB), for example. When the coupling of a channel is not optimal, the light will be modulated at the same frequency as the dither tone. When optimal coupling is achieved, however, the light will be modulated at twice the dither tone frequency. The processing electronics of the electronics module 180 may synchronously demodulate the amplitude variations on the channel power level signals produced by the optical channel monitor. When a tone of the dither frequency is present, the electronics may produce a dc control voltage to the switching axis electrodes to move the channel micromirror to the point of optimal coupling at which the signal from the optical channel monitor contains only modulation at twice the dither frequency.

The dither control approach may also be augmented by or replaced by an alternative approach that takes advantage of a Gaussian functional relationship between the coupling efficiency and angular rotation about each axis as illustrated in FIGS. 3A-B. This Gaussian function is of the form $$f(\alpha,\beta) \sim C\, e^{-A\alpha^2\, B\beta^2}$$

where $f(\alpha,\beta)$=Output power of a particular wavelength channel at a particular port
$\alpha$=Angle of rotation about the switching axis
$\beta$=Angle of rotation about the attenuation axis
A=Constant that determines sensitivity for rotation about the switching axis
B=Constant that determines sensitivity for rotation about the attenuation axis
C=Constant that defines the amplitude of the power The functional relationship defined in the above equation can be used to construct a feed forward algorithm that determines the angles $\alpha$ and $\beta$ that would orient the channel micromirror at the optimum coupling position. This may be achieved by sampling the power at the current angular orientation of the channel micromirror and two other angular positions, one by changing the angular position of the micromirror about the switching axis and the other by changing the angular position of the micromirror about the attenuation axis. This provides power readings at three different combinations of $\alpha$ and $\beta$ and three equations that can be used to solve for the three unknowns in the above described functional relationship $f(\alpha,\beta)$. The peak of the function $f(\alpha,\beta)$ may be determined by taking the first derivative of $f(\alpha,\beta)$ with respect to $\alpha$ and $\beta$, setting it equal to zero, and solving for $\alpha$ and $\beta$, as by known analytical or numerical methods. This approach can be readily extended to include the port mirror angular orientation as well. In this case there are two additional angles of rotation of the axes of the port mirror, and two more unknowns. The functional relationship then becomes $$f(\alpha,\beta) \sim C\, e^{-A\alpha^2 - B\beta^2 - G\gamma^2 - D\delta^2}$$

where $\gamma$=Rotation about Y axis of port mirror
$\delta$=Rotation about X axis of port mirror
G=Constant defining sensitivity for rotation about Y axis of port mirror
D=Constant defining sensitivity for rotation about X axis of port mirror In order to solve for the optimum power position, two additional power readings must be obtained at two different combinations of $\gamma$ and $\delta$ which provide two additional equations to solve for the two additional unknowns G and D. It is obvious to those skilled in the art that other equations and/or other numerical methods could be used to determine the angular positions that optimize coupling efficiency. It will also be apparent to those skilled in the art that these equations may also be utilized for controlling power or attenuation level of the optical signal by solving the equations for a selected power or attenuation level rather than the optimum coupling efficiency.

The electronics module of the control system of FIG. 4 may embody control programs and algorithms that alternately and periodically control the switching axis of a channel micromirror for optimal coupling and the attenuation axis of the channel micromirror to maintain a desired power level. The control system preferably does not control both axes simultaneously; however, the flexibility of the control system allows both axes to be controlled simultaneously. As will also be described shortly, the electronics module may employ algorithms that afford notchless operation, complete blocking of individual channels, and hitless switching. Prior to describing these concepts, an explanation will first be given with reference to FIG. 5 of the manner in which the power of individual spectral channels may be managed in accordance with the invention.

Figure 5:
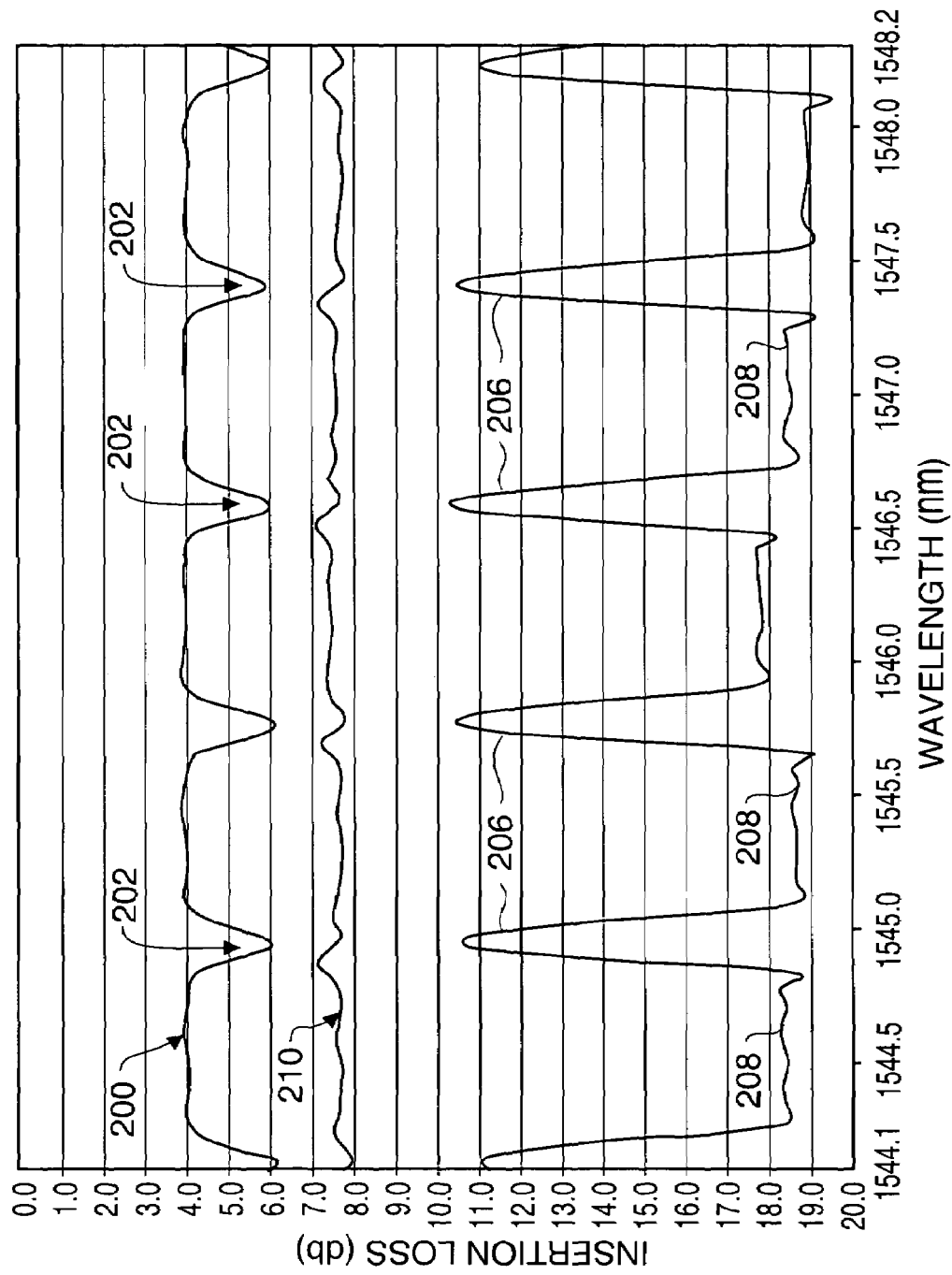
FIG. 5 shows plots of power level (represented as insertion loss) as a function of wavelength over the wavelength region of several adjacent channel micromirrors, the figure illustrating control of channel power to afford notchless operation.

FIG. 5 illustrates on the same plot three different curves that represent the power reflected from adjacent channel micromirrors over a wavelength region in the 1550 nm wavelength band corresponding to five adjacent spectral channels for different levels of attenuation (insertion loss). The curves may be generated using a tunable laser, for instance. The top curve 200 represents the reflected power from the five channel micromirrors for optimal coupling and zero dB attenuation. As shown, the reflected power is substantially constant at a level corresponding to approximately 4.0 dB insertion loss over a relatively wide wavelength region of each channel micromirror. This is referred to as the passband region, and corresponds approximately to 75% of the width of the channel micromirrors along the direction of the switching axis Y. Curve 200 also shows a region 202 between each channel micromirror corresponding to the location of the gap between adjacent micromirrors where there is a reduction in reflected power level. This region is referred to as the "notch" region. As shown, the power in the notch region may be down only a couple dB (approximately 2.0 dB in the figure) from the power level corresponding to 0 dB attenuation at the center of the channel micromirror. This is because the edges of the micromirrors are a source of diffraction from which the reflected power is less dependent on the angle of rotation of the micromirror, and, therefore, does not diminish with increased angular rotation in the same way reflected power diminishes from the flat mirror surface in the passband region. This is further illustrated by curve 204, which shows that by attenuating the power level by a relatively large amount (approximately 14 dB in the figure) the notch region transmits more power than the passband region. This notch region power is indicated by the peaks 206 in the figure which are at an insertion loss level of approximately 11.0 dB. The power represented by the peaks 206 is due to diffraction from the edges of the micromirrors. The power level in the passband region 208 between the peaks is at approximately 18.0 dB.

The middle curve 210 in FIG. 5 indicates that for an attenuation of about 4.0 dB, corresponding to an insertion loss of approximately 8.0 dB, the power level in the notch regions corresponds approximately to the power levels in the passband regions. This creates a near "notchless" operating condition in which the power level is substantially constant over the entire wavelength region corresponding to the adjacent micromirrors. This is a particularly advantageous feature of the invention because it enables the transmission of arbitrarily spaced wavelengths that do not need to conform to any specific ITU grid spacing. Thus, the invention enables the same set of channel micromirrors to be used for transmitting wavelengths on a 50, 100 or 200 GHz ITU grid spacing, as well as on wavelength bands that are common in coarse wavelength division multiplexing systems. Notchless operation also advantageously helps optimize passband and achieve the ITU specification for channel-to-channel power variation, which facilitates use with signals having different modulations, such as 10 GHz or 40 GHz.

Figure 6A:
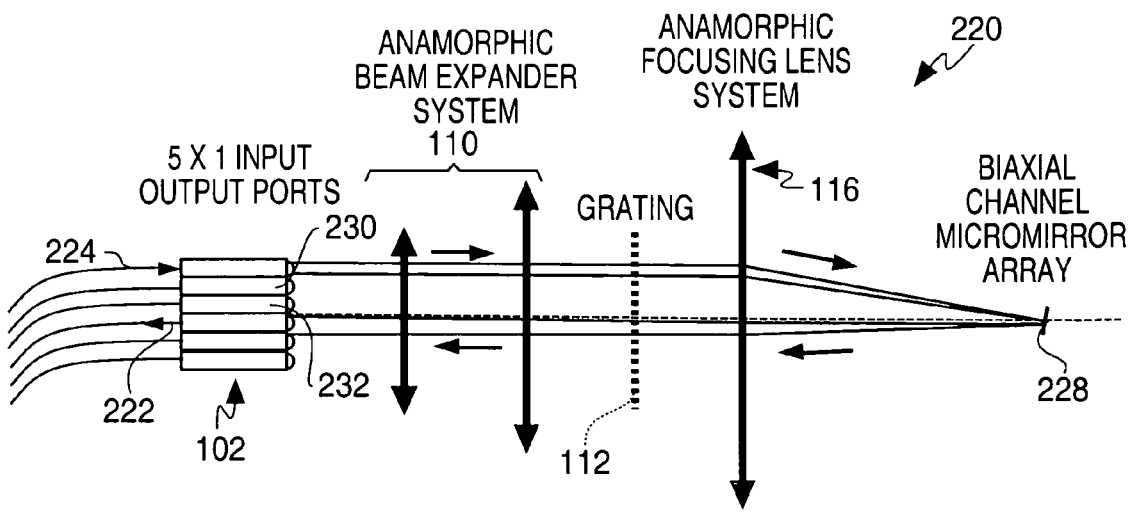
FIGS. 6A-C are diagrammatic views that illustrate hitless switching according to the invention in a first embodiment of an ADD module.
Figure 6B:
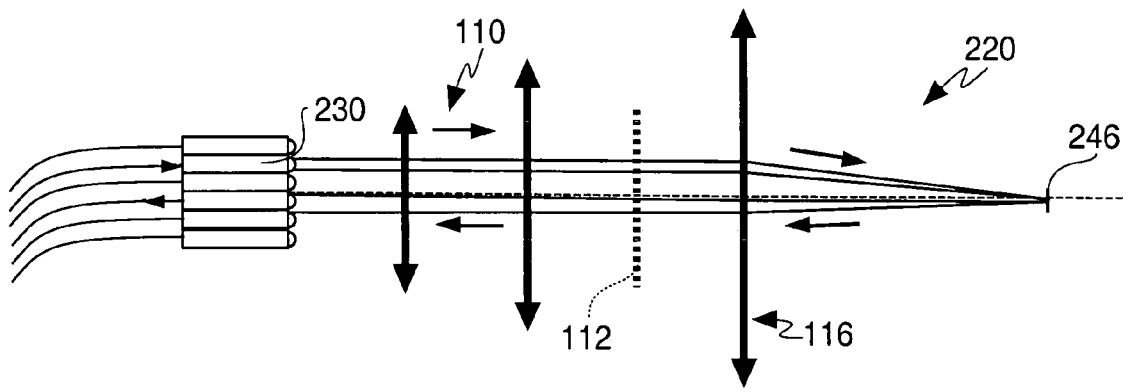
Figure 6C:
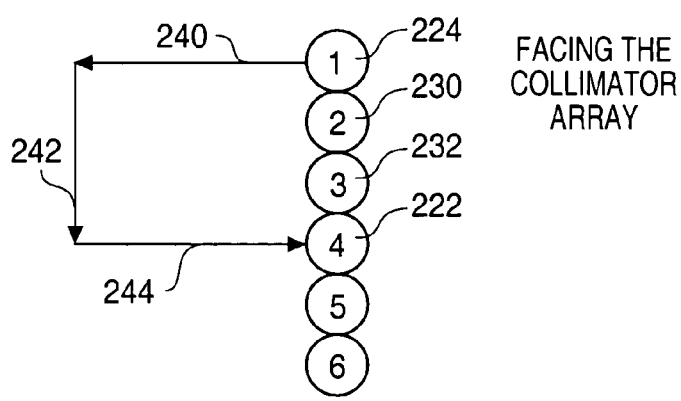

As is evident from FIG. 5, the power level transmitted by any particular spectral channel may be individually controlled by controlling the amount of attenuation applied to that channel. Complete blocking of the light of a spectral channel may be accomplished by rotating the corresponding channel micromirror about its attenuation axis by an amount needed to achieve the desired extinction ratio. This is particularly useful, for example, for "hitless" channel switching where the power in a spectral channel reflected from a micromirror undergoing switching rotation may be either completely blocked or reduced to a low level as the channel beam is switched from one port to another. Hitless switching avoids or minimizes the coupling of unwanted light to intermediate ports and undesirable cross-talk during switching, FIGS. 6A-C illustrate hitless switching in the context of an ADD multiplexer module 220, in which spectral channels may be input to the module on more than one input port and added to, i.e., combined with, the signal at the output port. FIGS. 6A-B generally represent simplified diagrammatic side views of the WSS 100 of FIG. 1, where certain of the elements of FIG. 1 have been omitted for clarity.

As indicated in FIGS. 6A-B, the ADD multiplexer 220 may comprise a 5×1 device having five input ports and one output port. The fiber collimator array 102 accordingly comprises six collimators, as shown in the figure. The output port 222 may be, for example, the fourth collimator port, as shown. In FIG. 6A, the first (top) collimator port 224 may input a spectral channel $\lambda_i$ that is focused by the anamorphic beam expander system 110 onto the diffraction grating 112. The diffraction grating spatially separates the spectral channel $\lambda_1$ from other wavelength channels, and supplies the separated spectral channel to the anamorphic focusing lens system 116, which focuses the spectral channel onto a corresponding channel micromirror 228. The channel micromirror may be rotated about its switching axis to the appropriate angular position to reflect (switch) the input spectral channel $\lambda_i$ back through the optical system to output port 222, as shown in FIG. 6A.

Switching the input spectral channel $\lambda_i$ from the input port 224 to the output port 222 may be done in a hitless manner. With hitless switching, the light input at port 224 is not scanned across the intermediate ports 230 and 232 as the channel micromirror is rotated to switch the beam to port 222. Rather, for hitless switching, the light is substantially attenuated or blocked during switching. To accomplish this, the servo control loop controlling the switching axis of channel micromirror 228 is first disengaged. A control voltage may be applied to the channel micromirror to rotate the micromirror about its attenuation axis by an amount required for blocking; the channel micromirror may then be rotated about its switching axis to reflect the input spectral channel to output port 222 by applying to the switching axis a preset control voltage stored in calibration tables in the electronics module memory of the control system of FIG. 4. Micromirror 228 may next be rotated about its attenuation axis back to a normal optimal coupling condition, and the servo control loop controlling the switching axis may then be re-engaged to control the micromirror to achieve optimum coupling efficiency.

FIG. 6C illustrates diagrammatically the process as light is switched from the input port 224 to the output port 222. Attenuating the input channel to a blocking condition is represented by the arrow 240 in FIG. 6C. Switching of the input channel by rotating micromirror 228 to port 222 is represented by the arrow 242 which indicates that as the light is switched between input port 224 and output port 222 no light is coupled to intermediate ports 230 and 232. The arrow 244 represents increasing the light back to a nominal optimal coupling condition by rotation of the channel micromirror about its attenuation axis.

FIG. 6B illustrates a second spectral channel at a different wavelength $\lambda_i$ entering the ADD multiplexer on port 230 and being switched by its corresponding micromirror 246 to output port 222. This switching may similarly be hitless and accomplished in a similar manner to that described above in connection with FIG. 6A. The optical signal output on port 222 in FIG. 6B thus may comprise a combination of $\lambda_i$ input on port 224 and $\lambda_i$ input on port 230. In a similar fashion, other wavelengths may be input on the other input/add ports and be switched to output port 222 to form a composite multi-channel signal.

Controlling the optical signals as shown in FIGS. 6A-B in order to switch from a first attenuated state to a second different attenuated state at the output port may be accomplished by different methods. According to a first method, the light entering the input port may be in a maximum coupling state, i.e., at full power. Next, hitless switching from the input port to the output port may be accomplished by using the attenuation axis for maximum attenuation, as represented in FIG. 6C, while the input beam is switched hitlessly to the output port as described above. Once the beam is at the output port, the attenuation axis can be controlled to return to full power corresponding to zero attenuation. The coupling efficiency may then be optimized at the full power condition, and, upon achieving optimal coupling, the beam is attenuated by controlling the movement of the channel micromirror about its attenuation axis to provide the desired output power level.

A second method is to go directly from the original attenuated state at the input port to the desired attenuated state at the output port without first unattenuating to maximum coupling efficiency. This method utilizes calibrated voltages stored in look-up tables in the memory of the electronics module of the control system that specify the attenuation level for each channel micromirror as a function of rotation angle (e.g., electrostatic voltage) about the attenuation axis.

A third and preferred method for hitless switching is to go from an attenuated state at an input port to a low light state at that port by rotation about the attenuation axis to minimize the power. Next, a hitless switch to the desired destination port is performed with the attenuation-axis retained at the minimum power, e.g., the blocking condition. Then, upon reaching the destination port, the channel micromirror is rotated about the attenuation axis to go to a low light level such as, for example, −20 dB, rather than back to full power; the coupling efficiency at the low light level may then be optimized using the switching axis of the channel micromirror (and, preferably, also the corresponding port mirror 106 shown in FIG. 1, in a manner to be described shortly). Then, upon achieving optimal coupling efficiency, the channel micromirror may be rotated about its attenuation axis for the desired power level.

In addition to controlling coupling efficiency by controlling the rotation of a channel micromirror about its switching axis, it is also desirable to control the location at which the spectral beam of each channel is focused on to its corresponding channel micromirror. In order to afford a high passband, and a high data transmission rate, the center wavelength of the channel should be aligned to the center of the channel micromirror. The center wavelengths of other channels should similarly be aligned with the center of their corresponding micromirrors. Channel spacing is specified by ITU grid specifications, and the channel micromirrors are laterally spaced in the array according to the ITU grid spacing of the input multi-channel optimal signal. It is, therefore, desirable to maintain ITU alignment so that the center wavelengths of all channels remain centered on their corresponding micromirrors in order to maximize the passband of the system.

The WSS system of the invention enables ITU alignment to be established and maintained under adverse operating conditions. As previously described, WSS 100 of FIG. 1 may include a beam splitter 124 located within the optical beam path between the port mirror array 106 and the anamorphic beam expander and relay system 110. Reference light, e.g., 1310 nm wavelength from a light-emitting diode (not shown), may be coupled into the composite multi-wavelength optical system at the input port of the fiber collimator array. The beam splitter may be formed to preferentially reflect the 1310 nm wavelength light beam to the PSD 126 and pass the spectral channel wavelengths, e.g., at C-band, to the anamorphic system 110. The PSD may comprise an array of photocells arranged in the form of a 4-quadrant photodetector, i.e., a "quad cell". The 1310 nm reference light reflected from the beam splitter onto the PSD causes voltage potentials to be developed in each quadrant of the PSD that can be used to determine the centroid position of the reference light beam impinging upon the PSD. The centroid position can be used to determine alignment of the beam.

The direction in which the input collimator 102 points may change as a function of temperature, causing the location at which an input spectral beam is focused onto a micromirror to deviate from the center of the micromirror, producing ITU misalignment and narrowing of the channel passband. In addition, other thermal-mechanical effects may cause changes in the diffraction grating angle, the positions of the channel micromirrors, and the focal length of the optics. Each of these effects can also result in ITU misalignment and passband narrowing. In order to compensate for ITU misalignment, the port mirrors may be rotated to realign the channel center wavelength onto the center of the channel micromirrors.

In the embodiment of the WSS shown in FIG. 1, the angular position of a port mirror is relayed onto the entrance aperture of the telecentric focusing optics, and angular changes at the input to the telecentric optical system due to changes in the rotational position of a port mirror are translated into changes in spot position at the focal plane. Accordingly, rotation of a port mirror or input beam is relayed by the anamorphic beam expander onto the entrance aperture of the focusing optics. This leads to translation of a channel with respect to a channel micromirror, and scans a channel across its associated channel micromirror. When the center wavelength of the channel is aligned with the center of the channel micromirror, corresponding to ITU alignment, the reference light beam reflected from the beam splitter 124 will impinge upon the PSD at a predetermined location. The voltages produced by the four quadrants of the PSD, which represent beam alignment, may be compared to pre-set reference (calibration) voltages stored in a memory of the control electronics 128, and used by the control electronics as a feedback signal to control the port mirror to center the beam on the channel micromirror. Thus, the position of the reference light on the PSD can be used for ITU channel alignment. This position can be calibrated for a wide range of operating conditions so as to continuously maintain ITU alignment under broad environmental conditions.

If the pointing of the collimator or one or more of the other previously described elements changes due to changes such as system temperature, a new port mirror angle and reference light beam position (x1, y1) on the PSD will be needed to maintain ITU alignment. Accordingly, a set of calibration points may be generated for the required PSD spot position as a function of temperature to maintain ITU alignment, and the calibration points stored in a table in the memory of the control electronics 128. Temperature sensors may be located within the WSS module to monitor temperature changes, and the temperature information and set point information from the calibration table supplied to a feed forward servo system in the control electronics to control all of the port mirrors of the array to maintain ITU alignment. To account for variations due to hysteresis, for example, calibration information may be stored in the table for both increasing and decreasing temperature conditions.

Another advantage of the architecture of the invention is that it affords the ability to confirm the distribution of wavelengths in the various output or pass-through ports of an ADD module, such as that shown in FIG. 6A-B (or in FIGS. 7 and 8 to be described shortly), or in the output and drop ports of a DROP module. Wavelength identification may be accomplished by inducing small amplitude, low frequency dither modulation on the optical signals reflected from a port micromirror, as, for example, by causing a small amplitude dither rotation of the port micromirror, and detecting the modulation in the feedback control system of FIG. 4.

The dither may be asserted about either axis of rotation of the port micromirror. Dithering modulates the optical signals associated with a particular output or pass-through port that are reflected by that port micromirror. The modulation preferably creates a power fluctuation in the signals of the order of approximately 0.05 dB at the pixels of the photodiode array 196 in the optical channel power monitor 176 of FIG. 4. This power fluctuation may be converted into an electronic signal and supplied to the control software in the electronics module 180 to indicate the optical signal wavelengths being directed into the output or pass-through port by the port mirror undergoing the dither rotation. The dither frequency of the port mirror is preferably a low frequency (approximately 100 to 200 Hz) as compared to the frequencies of the telecommunication signals being transmitting by the optical signals so as not to cause significant noise or disruption.

In a typical ring network, there may be several wavelength selective switch modules in operation simultaneously. If each wavelength selective switch module in the ring network utilizes the same dither frequency to indicate the wavelengths passing through a port, there could be a significant accumulation of noise at the dither frequency in the telecommunication signal. Therefore, it may be desirable to use a different dither frequency for each module in the network ring. To accomplish this, each WSS module may be assigned a unique dither frequency, preferably one that is at least 5 Hz different from that of other WSS modules in the ring. The frequency assignment process may be automated, as for example, by performing an electronic search for dither frequencies already in use, and then assigning a frequency that is not being utilized.

The 5×1 (N×M) architecture of the ADD module 220 shown in FIGS. 6A-B is typical of an ADD module, where optical channel signals having center wavelengths $\lambda_1$ to $\lambda_n$ can enter in any combination through N input and add ports, and exit through one (M=1) output port. There is no theoretical limitation to the number of in and add ports (N) in this architecture or to the number of wavelengths. However, there is a restriction that a particular wavelength $\lambda_i$ can only enter from one port. Multiple $\lambda$'s can enter from either the input or add ports so long as these $\lambda$'s are different from one another.

Figure 7:
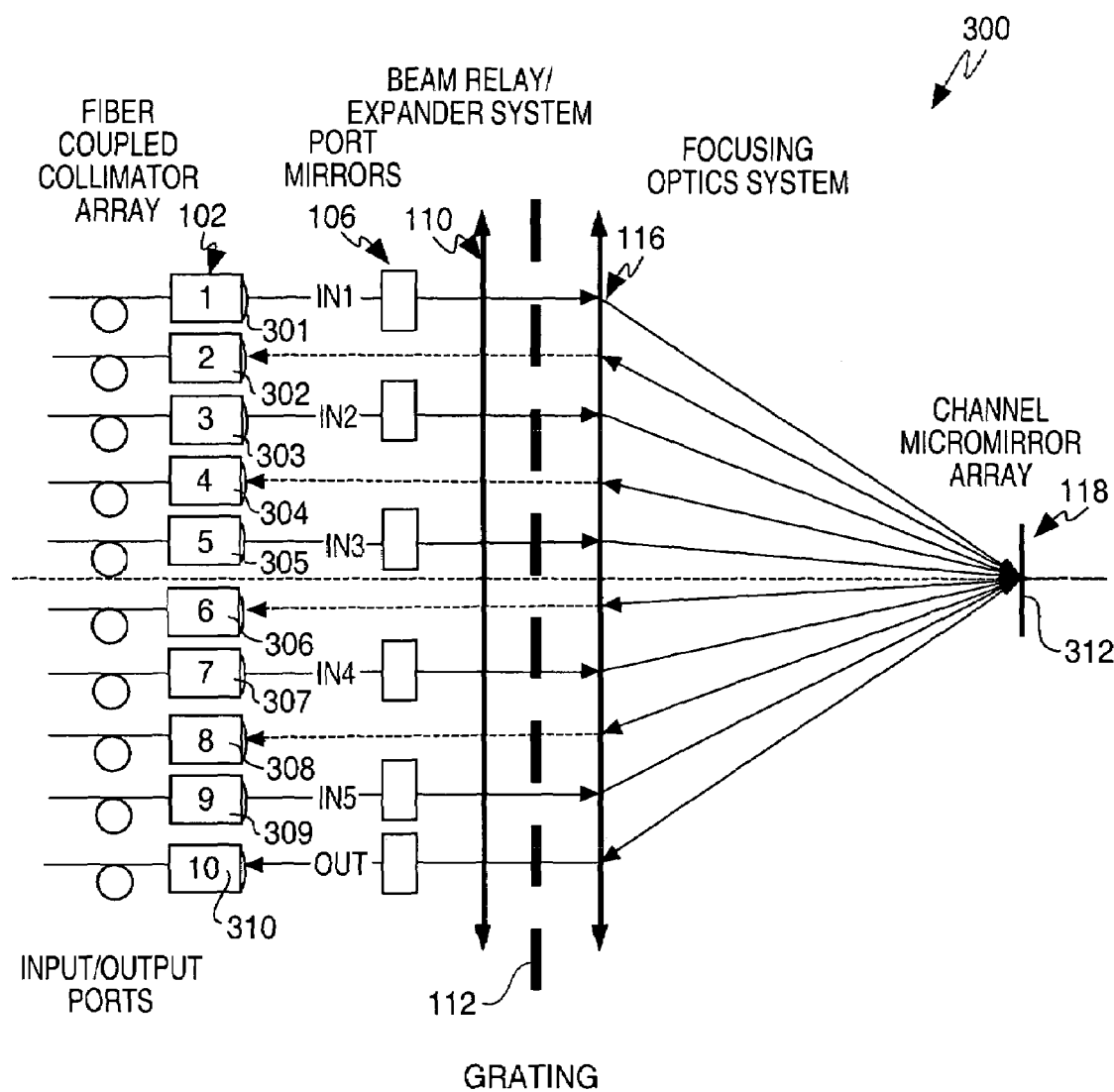
FIG. 7 is a diagrammatic view of a second embodiment of an ADD module that may be employed in the invention.

FIG. 7 is a simplified figure that illustrates another embodiment of an ADD module 300 architecture that circumvents the foregoing limitation. (The multiple micromirrors are into the plane of the paper.) As shown, this embodiment is a 5×1 and 1×5 module having 5 input or add ports (IN1-IN5) and 5 output ports arranged so that the odd numbered ports (301, 303, 305, 307 and 309) are input/add ports and the even numbered ports (302, 304, 306, 308 and 310) are output ports. However, in this arrangement, all ports but the bottom (in the figure) port, OUT 310, are "dark" ports, meaning that light going to these ports disappears. The advantage of the configuration of FIG. 7 is that it allows an optical channel of a particular wavelength $\lambda_i$ to enter from more than one input or add port. However, only one of the channels of wavelength $\lambda_i$ will exit through the OUT port 310. This is because the angle of the channel micromirror 312 associated with wavelength $\lambda_i$ determines the direction in which the beam will reflect. This in turn determines the output port through which that wavelength $\lambda_i$ will exit. All other wavelengths $\lambda_i$ will exit through some other dark output port or into free space. For example, a second signal of wavelength $\lambda_i$ entering through port 303 will be directed by the channel micromirror 312 to port 308. The configuration shown in FIG. 7 has numerous applications in optical telecommunications systems, as for example, where it is desired to combine multiple input groups of wavelengths together to form a single output group of wavelengths without any duplicate wavelengths.

Figure 8:
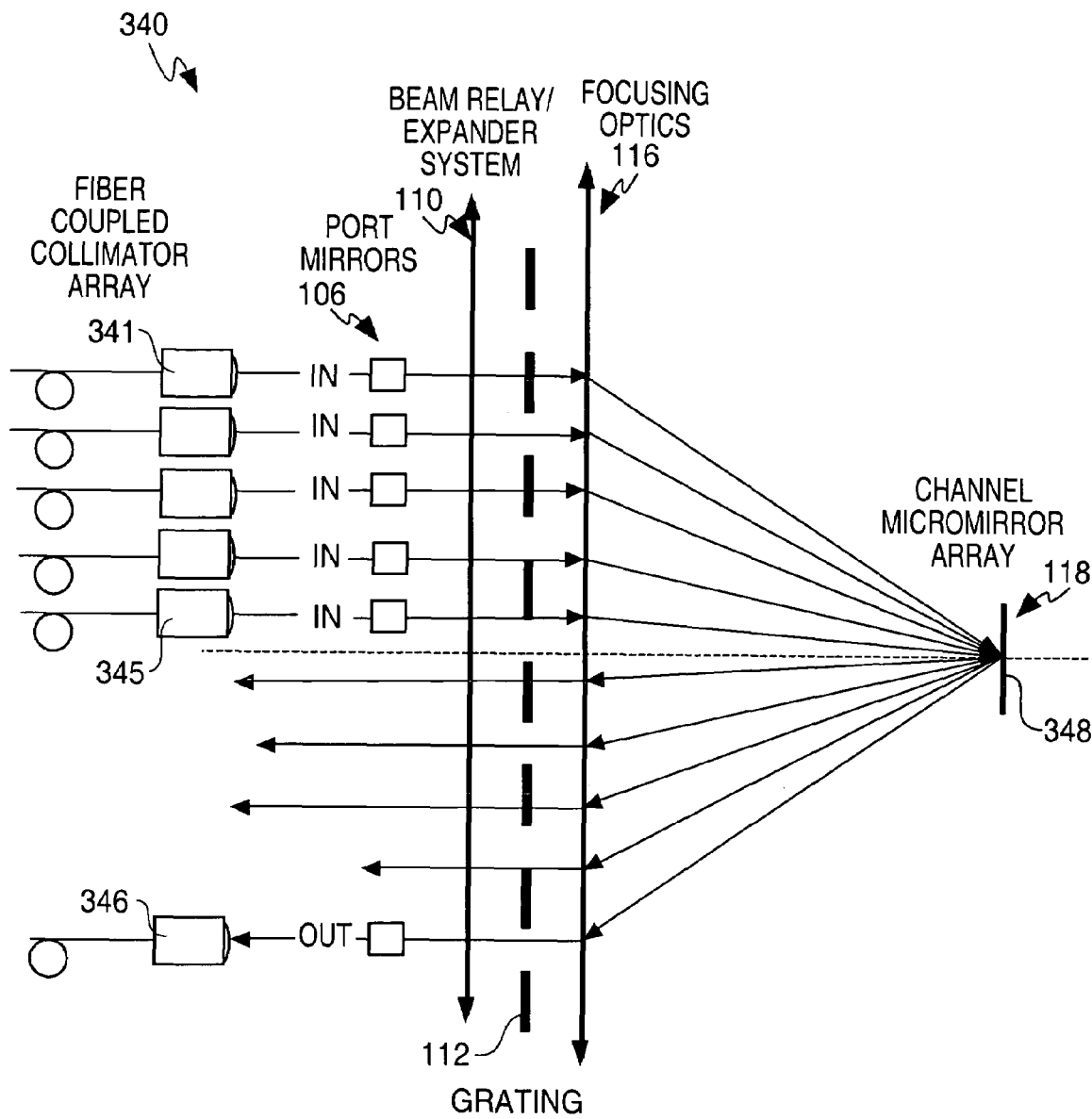
FIG. 8 is a diagrammatic view of a third embodiment of and ADD module that may be employed in the invention.

FIG. 8 illustrates another embodiment of a 5×1 ADD module 340 that is similar in function to the embodiment of the ADD module 300 shown in FIG. 7. ADD module 340 may comprise 5 input or add ports 341-345, and 1 OUT port 346. It has a similar advantage to ADD module 300 in that a particular wavelength $\lambda_i$ can enter from multiple ones of the input or add ports 341-345. However, depending on the angle of the channel micromirror 348 associated with wavelength $\lambda_i$, only one of the entering channels of wavelength $\lambda_i$ will exit through the OUT port 346. All of the other entering wavelengths $\lambda_i$ will exit to free space. The principal difference between the previous two ADD module configurations of FIGS. 7 and 8 is a different physical layout. The operation of the two is substantially the same.

The WSS optical module 162 shown in the feedback control arrangement of FIG. 4 is representative of a DROP module where there is one input port and multiple output or drop ports. In a DROP module, power management of output optical channels may be implemented, as shown in FIG. 4, by sampling a percentage of the light from the outgoing fiber of each output or drop port, as shown in FIG. 4, and using the samples in a control system as described previously to measure and control the optical power of each channel to obtain desired power levels.

In the case of an ADD module, such as illustrated in FIGS. 6-8, the same methods of channel alignment and power level control of output channels as previously described also may be employed. However, in an ADD module, power management may be additionally applied to the optical channels entering the input and add ports. This may be accomplished by sampling a percentage of the light from the spectral channels entering each of the input and add ports, combining the samples into a composite multi-channel signal in the same way as described in connection with FIG. 4, and providing the composite optical signal to an optical channel monitor and control system, such as described previously in connection with FIG. 4, in order to control the channel micromirrors to obtain desired power levels for the incoming optical signals.

For an ADD module, power level control of both input and output channels may be implemented by either of two different approaches. One approach may employ separate optical channel monitors, one for the light power in the input and add fibers, and one for the light from the output and drop fibers. The two channel monitors may be substantially the same as shown and described in FIG. 4, and may employ either the same or separate electronics modules for controlling the attenuation axes of the channel micromirrors. This would allow simultaneous monitoring and control of the power of both the incoming and outgoing spectral channels.

A second approach would be to employ separate combiners, such as combiner 172, one for the input and add channels and one for the output and drop channels, a 1×2 switch to select the composite signal from either the input or output combiner, and a single optical channel monitor and electronics module which would monitor and control the incoming light or the outgoing light depending on the position of the switch. The incoming light and pass-through light may be monitored if a specific attenuation level is sought, and the outgoing light may be monitored if a specific power level is desired.

In accordance with the invention, the method of maintaining channel beams centered on their associated channel micromirrors for ITU grid alignment in both ADD and DROP modules may be similar to that previously described in connection with FIG. 1. In an ADD module, the reference light may be injected into (combined with) the input light from one incoming fiber and focused onto a single quad cell, as described. However, because other add ports may also contain other incoming spectral channels, any change in alignment of those spectral channels may be compensated for by a calibrated amount of rotation about one or both axes of each of the micromirrors in the port mirror array associated with the add ports. That is, the micromirrors in the port mirror array associated with the add ports may be slaved to the micromirror in the port mirror array associated with the input port, so that all input and add port micromirrors may be controlled together based upon control of the input port.

From the foregoing, it can be seen that reconfigurable optical add-drop systems and methods in accordance with the invention afford a simplified and integrated architecture having a number of advantages. Among others, these include effective, flexible and highly accurate methods of power management of individual spectral channels on a channel-by-channel basis; hitless switching of channels that avoids cross-talk and interference to intermediate channels; notchless operation that enables accurate management of power across channels and operation at various wavelength grid spacing; optimization of optical characteristics resulting in high passband and ITU channel alignment; and optimum mechanical characteristics of both the modules and components such as micromirrors.

While the foregoing description has been with reference to particular embodiments of the invention, it will be appreciated by those skilled in the art that changes may be made in these embodiments without departing from the spirit and principles of the invention, the scope of which is defined in the appended claims.

The invention claimed is:

1. Optical apparatus for switching multi-channel optical signals having spectral channels of different wavelengths, comprising:
   fiber coupled collimators providing a plurality of input and output ports for optical signals having one or more of said spectral channels;
   an anamorphic system receiving an optical signal from an input port of the fiber collimators and being formed to convert the optical signal to a beam having a predetermined beam profile;
   a diffraction grating for spatially separating the beam into constituent spectral channel beams;
   focusing optics for converting the constituent spectral channels into channel beams having an elongated channel beam profile;
   an array of biaxial channel micromirrors, the micromirrors having an elongated shape compatible with said elongated channel beam profile, and each micromirror of the array being positioned to receive one of said constituent spectral channels; and
   a control system for controlling the rotation of a channel micromirror of said array receiving said one spectral channel about a first switching axis to switch said one spectral channel to a selected output port, and for controlling the rotation of the channel micromirror about a second attenuation axis to vary the coupling of said one spectral channel to the selected output port to control the power level of said one spectral channel output at such selected port for a selected power level.

2. The apparatus of claim 1 wherein the focusing optics comprises anamorphic optics that focuses the spectral channel beams as spots centered on the micromirrors with an elongated spot shape that conforms to the elongated shape of the micromirrors.

3. The apparatus of claim 2, wherein the anamorphic system and the focusing optics comprise lenses having different magnifications in orthogonal directions, said magnifications and the elongated shape of said micromirrors being selected such that a first coupling sensitivity to angular rotation of a micromirror about the attenuation axis for coupling the spectral channel to the selected output port is less than a second coupling sensitivity to angular rotation of the micromirror about the switching axis to switch the spectral channel to the selected output port.

4. The apparatus of claim 2, wherein the anamorphic system and the focusing optics have said magnifications selected to focus a spectral channel beam to a spot size on said micromirror that reduces aerodynamic cross-talk.

5. The apparatus of claim 2, wherein the anamorphic system and the focusing optics have said magnifications selected to focus a spectral channel beam reflected from a micromirror to said selected output port to a spot size that reduces coupling and cross-talk to an adjacent output port.

6. The apparatus of claim 1, wherein said control system is responsive to predetermined values corresponding to rotational positions of the channel micromirror about the switching axis for switching said one spectral channel to different output ports, and further includes control electronics responsive to a measurement of power in said spectral channel for controlling the rotation of the channel micromirror about the attenuation axis for said selected power level.

7. The apparatus of claim 6, wherein the predetermined values correspond to nominal optimal couplings of a spectral channel to an output port, and the control electronics uses the predetermined values for an initial rotational position of the micromirror to switch the spectral channel to the output port.

8. The apparatus of claim 6, wherein the control system modulates spectral channels with dither tones, and the control electronics detects the dither tone modulation on the spectral channels at the output port and controls the corresponding channel micromirrors to optimize the coupling of the spectral channels to the output port.

9. The apparatus of claim 8, wherein the control system dithers the switching and attenuation axes of a channel micromirror by applying out of phase control signals at a dither frequency to modulate the spectral channel signal reflected from the micromirror with said dither tone modulation, and the control electronics rotates the micromirror about the switching axis in response to detecting the dither modulation to optimize the coupling of the spectral channel signal to the output port.

10. The apparatus of claim 8, wherein the control system dithers the switching and attenuation axes of a channel micromirror and measures the power level at different combinations of angular positions of the axes; utilizes a feed forward algorithm based on a predetermined relationship between power and rotation angle of each axis to predict rotation angles that provide optimal coupling efficiency; and rotates the channel micromirror to said rotational angles to achieve optimal coupling efficiency.

11. The apparatus of claim 6, wherein the control system comprises an optical channel monitor for measuring the power in a spectral channel at an output port, and said control electronics compares said measured power in the spectral channel with said selected power level and rotates the corresponding channel micromirror about the attenuation axis to manage the spectral channel power level to the selected power level.

12. The apparatus of claim 11, wherein the control system comprises control programs that control rotation of a channel micromirror about the attenuation axis to attenuate a spectral channel signal reflected from said micromirror during switching of the spectral channel signal for hitless switching.

13. The apparatus of claim 12, wherein the control system rotates the channel micromirror during hitless switching to substantially block reflected light.

14. The apparatus of claim 11, wherein the control system comprises control programs that control rotation of the channel micromirrors about their attenuation axes to adjust the power in optical signals from said micromirrors for notchless operation.

15. The apparatus of claim 14, wherein for notchless operation the control system attenuates the power of a spectral channel in a passband region of a micromirror to approximately a level of optical power in a notch region between adjacent micromirrors.

16. The apparatus of claim 14, wherein the control system comprises memory stored calibration values corresponding to the rotational position of a channel micromirror about the attenuation axis for predetermined power levels of a spectral channel, and the control electronics is responsive to said calibration values for rotating the channel micromirror to the value corresponding to a selected power level of the spectral channel.

17. The apparatus of claim 2 further comprising a rotatable port mirror that reflects the optical signal from said input port to the anamorphic system so as to locate a spectral channel beam onto a micromirror at a position on the micromirror that is determined by the angle of rotation of the port mirror, and port mirror control electronics responsive to a location on a photodetector of a reference beam from said input port for controlling the rotation of the port mirror to align the position of said channel beam centered on said micromirror.

18. The apparatus of claim 17, wherein there is an array of port mirrors, one for each of the fiber collimator ports, and the apparatus further comprises a beam splitter disposed between the port mirror array and the anamorphic system for reflecting said reference beam to said photodetector while passing said optical signals to said anamorphic system.

19. The apparatus of claim 17, wherein the port mirror control electronics comprises memory stored values representative of deviations from alignment of the channel signals on the micromirrors for different locations of the reference beam on said photodetector, and a control circuit responsive to a deviation of the reference beam from a predetermined location for controlling the port mirrors of said array to realign said channel signals.

20. The apparatus of claim 17, wherein there is an array of port mirrors, one port mirror for each fiber collimator port, disposed optically between the fiber collimators and the anamorphic system, and wherein the port mirror control electronics controls the port mirrors to position spectral channel beams on the micromirrors for optimum coupling of the spectral channels reflected to an output port.

21. The apparatus of claim 17, wherein the port mirror is biaxial, and the control system dithers orthogonal axes of the port mirror, measures the power level at different combinations of angular positions of said axes, utilizes a feed forward algorithm based on a predetermined relationship between power and rotation angle of each axis of said port mirror to predict the rotation angles that provide optimal coupling efficiency, and rotates the port mirror to said rotational angles to achieve optimal coupling efficiency.

22. The apparatus of claim 21, wherein the control system further dithers the switching and attenuation axes of a channel micromirror; measures the power level at different combinations of angular positions of said port mirror and said channel micromirror, utilizes a feed forward algorithm based on said predetermined relationship for said port mirror and on another predetermined relationship between power and rotation angle of each axis of the channel micromirror to predict the rotation angles that provide optimal coupling efficiency and a selected power or attenuation level, and rotates said channel mirror and said port mirror to such rotation angles to achieve optimal coupling efficiency or a selected power or attenuation level.

23. A method of optimizing optical apparatus for switching optical signals of a multi-channel optical signal having spectral channels of different wavelengths between input and output ports, comprising:

converting the optical signals from one or more input ports into beams having predetermined beam profiles by anamorphically expanding the beams in orthogonal directions;

spatially separating said beams into constituent spectral channel beams having elongated channel beam profiles;

focusing the separated spectral channel beams as elongated spots onto corresponding channel micromirrors, the channel micromirrors having an elongated shape and size that is compatible with the shape and size of said elongated spots, said focusing comprising aligning said elongated spots to be centered on said corresponding micromirrors, and rotating a channel micromirror about a first axis to switch a corresponding spectral channel to a selected output port, and rotating the channel micromirror about a second orthogonal axis to control the power of the spectral channel coupled to the selected output port.

24. The method of claim 23 further comprising reflecting the optical signals from a port mirror, the rotational position of which moves the focused elongated spots of the constituent spectral channels across the micromirrors, determining the locations of the focused elongated spots on the channel micromirrors, and maintaining the elongated spots centered on the micromirrors.

25. The method of claim 24, wherein said determining comprises detecting the position of a reference beam injected into an input port with said optical signals on a detector, and wherein said maintaining comprises controlling the port mirror to maintain the reference beam at a predetermined location on the detector.

26. The method of claim 24 further comprising modulating the optical signals with dither tones of a predetermined frequency, detecting the dither tone modulation on spectral channels at an output port, and controlling the channel micromirrors for a predetermined detected dither tone modulation condition.

27. The method of claim 26, wherein said modulating comprises modulating the spectral channels with out-of-phase dither tones, and said controlling comprises controlling for a detected dither modulation at a multiple of the predetermined frequency.

28. The method of claim 24 further comprising modulating the optical signals with dither tones of different predetermined frequencies, detecting the dither tone modulation on spectral channels at an output port, and identifying the spectral channels coupled to ports from said predetermined dither tone frequencies.

29. The method of claim 24, wherein the port mirror is biaxial, and the method further comprises dithering orthogonal axes of the port mirror, measuring the power level at different combinations of angular positions of said axes, using a feed forward algorithm based on a predetermined relationship between power and rotation angle of each axis of said port mirror to predict the rotation angles that provide optimal coupling efficiency, and rotating the port mirror to said rotational angles to achieve optimal coupling efficiency.

30. The method of claim 24 further comprising dithering orthogonal switching and attenuation axes of a channel micromirror; measuring the power level at different combinations of angular positions of said port mirror and said channel micromirror, using a feed forward algorithm based on a predetermined relationship for said port mirror and on another predetermined relationship between power and rotation angle of each axis of the channel micromirror to predict the rotation angles that provide optimal coupling efficiency and a selected power or attenuation level, and rotating said channel mirror and said port mirror to such rotation angles to achieve said optimal coupling efficiency or a selected power or attenuation level.

31. The method of claim 23 further comprising reducing the power in the spectral channel at a first port to a minimum power level by rotating the micromirror about the second orthogonal axis; switching the spectral channel to a second port by rotating the channel micromirror about the first axis while maintaining said minimum power level; increasing said power to a low power level by rotating the channel micromirror about the orthogonal axis; optimizing the coupling of the spectral channel at the second port at said low power level by rotating about the first axis; and increasing the power level to a selected power level by rotating the channel micromirror about the orthogonal axis.

32. (Previously Amended) The method of claim 23 further comprising measuring the power of individual spectral channels of said multi-channel optical signal, and applying feedback control to the orthogonal axis of the channel micromirrors for a predetermined power level of said individual spectral channels.

33. The method of claim 23 wherein said converting comprises applying different magnifications to said beams in orthogonal directions, and selecting said magnifications such that said focused elongated spots have a shape and size on the micromirrors that optimizes optical passband.

34. The method of claim 33, wherein said selecting comprises selecting said magnifications for a spot size on a micromirror that reduces aerodynamic cross-talk.

35. The method of claim 33, wherein said selecting comprises selecting said magnifications for a spot size of a spectral beam reflected from a micromirror to said selected output port that reduces coupling and cross-talk from said reflected beam to an adjacent output port.

36. The method of claim 23 further comprising rotating a channel micromirror about both a first and a second axis to control the power of the spectral channel coupled to the output port.

37. A method of aligning the spectral channels of a multi-channel optical signal onto corresponding channel micromirrors of an array of micromirrors in optical apparatus that switches the spectral channels to different output ports, comprising:
  directing a multi-channel optical signal comprising a plurality of spectral channels having different center wavelengths and a reference beam from an input port to a rotatable port mirror;
  spatially separating the multi-channel optical signal from the port mirror into constituent spectral channels, the separated spectral channels being spaced in accordance with their center wavelengths;
  focusing the separated spectral channels as spots onto corresponding channel micromirrors of an array of micromirrors, the micromirrors of the array being spaced according to the separation between adjacent constituent spectral channels, and the location of a spot on a corresponding micromirror being determined by an angle of rotation of the port mirror;
  directing the reference beam onto a detector, the reference beam having a location on the detector determined by the angle of rotation of the port mirror; and
  controlling the rotation of the port mirror to position the reference beam on the detector at a predetermined location that aligns adjacent separated spectral channels onto corresponding adjacent channel micromirrors at a predetermined location on said channel micromirrors.

38. The method of claim 37 further comprising storing detector voltages corresponding to deviations from said predetermined location of the reference beam caused by changes in environmental conditions; monitoring said environmental conditions; and controlling the port mirror using said stored voltages to realign the spectral channels to said predetermined location on the corresponding micromirrors upon detecting said changes in environmental conditions.

39. The method of claim 37 further comprising aligning said spectral channels to meet an ITU grid specification.

* * * * *